INVENTOR.
OTIS E. STAPLES

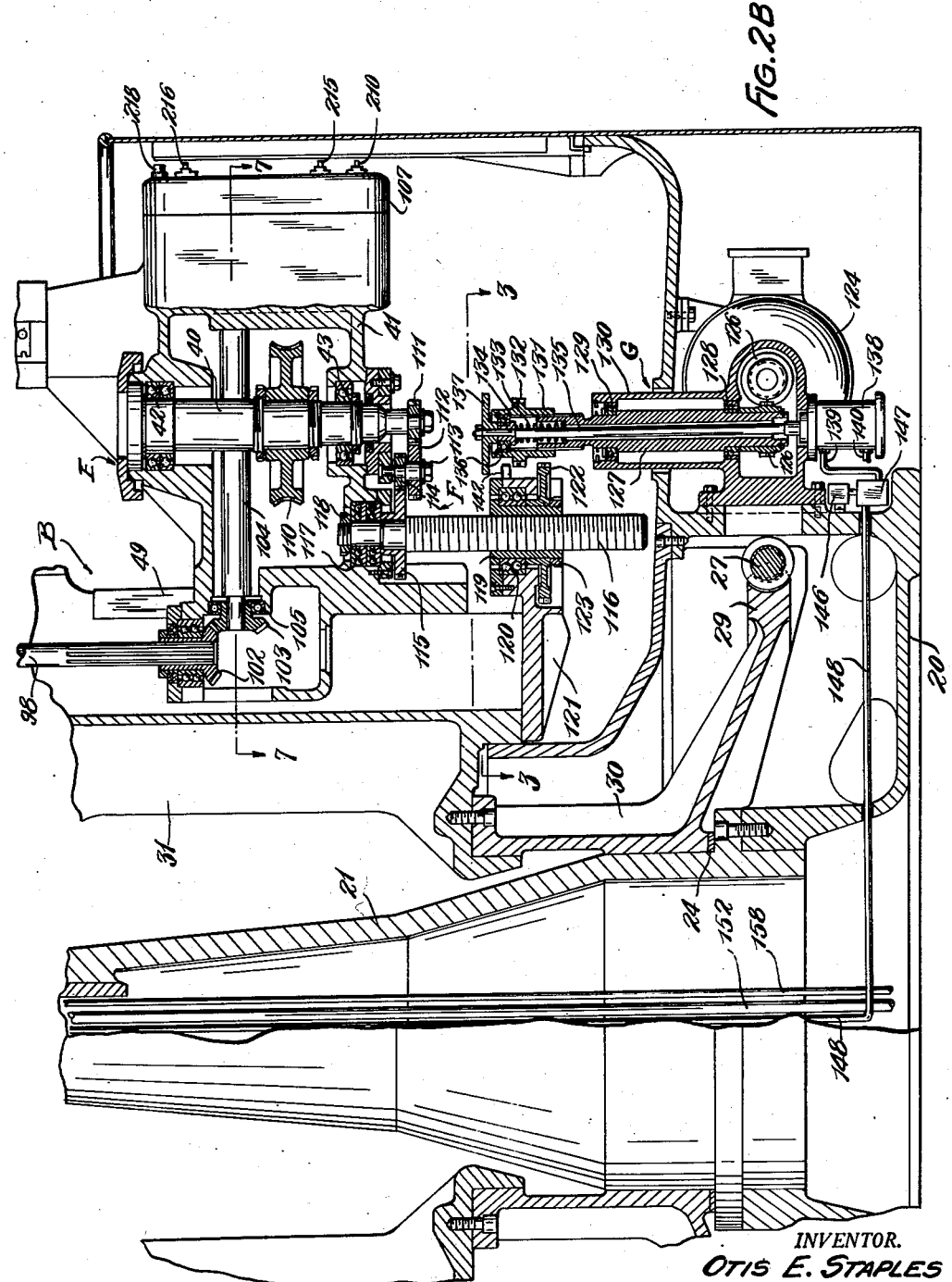

Sept. 18, 1951     O. E. STAPLES     2,568,667
MACHINE TOOL
Filed April 8, 1950     7 Sheets-Sheet 4
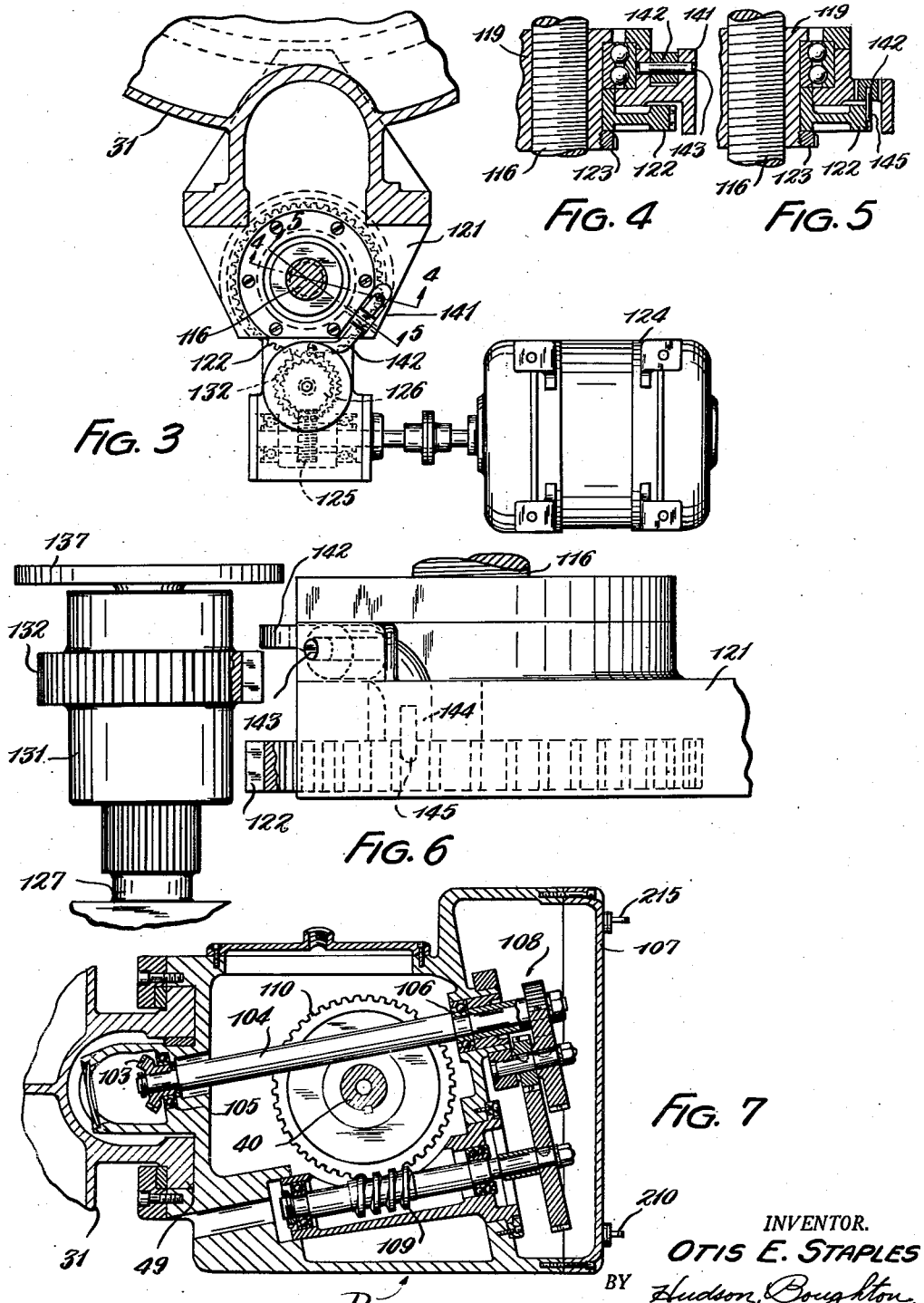

Sept. 18, 1951　　　O. E. STAPLES　　　2,568,667
MACHINE TOOL

Filed April 8, 1950　　　　　　　　7 Sheets-Sheet 5

INVENTOR.
OTIS E. STAPLES
BY Ludlow, Brighton,
Williams, David & Hoffmann
ATTORNEYS Patented Sept. 18, 1951

2,568,667

UNITED STATES PATENT OFFICE 2,568,667

MACHINE TOOL

Otis E. Staples, Euclid, Ohio, assignor to The Cleveland Hobbing Machine Company, Euclid, Ohio, a corporation of Ohio Application April 8, 1950, Serial No. 154,800

23 Claims. (Cl. 90—4)

1

The present invention relates to machine tools and, more particularly, to gear cutting or hobbing machines of the rotating turret type.

An object of the invention is the provision of an improved multi-unit, rotatable turret type machine tool having a single power operated mechanism for effecting rapid traverse movement in each of the operational units carried by the turret thereby resulting in a less expensive construction than prior art machines employing separate power means for each unit while retaining the desirable operational features thereof.

Another object of the invention is the provision of an improved machine tool comprising a plurality of operational units mounted upon a rotatable turret, each unit comprising rotatable tool and work spindles having relative movement with respect to each other in a path substantially parallel with the axis of the turret at either a rapid traverse or a feeding rate of speed, there being a single power means for sequentially effecting the rapid traverse movement for each unit when positioned at a common loading station.

A more specific object of the invention is the provision of an improved machine tool comprising a plurality of operational units mounted upon a rotatable turret, each unit comprising rotatable tool and work spindles one of which is movable relative to the other in a path substantially parallel with the axis of the turret at either a rapid traverse or a feeding rate of speed, there being a single power means for sequentially effecting the rapid traverse movement for each unit when positioned at a common loading station and a common power means for effecting feeding movement of each unit either during rotation of the turret or while the turret remains stationary.

A further object of the invention is the provision of an improved machine tool as defined in the preceding paragraph and further comprising novel control means for automatically terminating rotation of the turret as each operational unit arrives at the loading station thereby automatically sequentially positioning each unit for cooperative engagement with the single power means for effecting the rapid traverse movement.

An additional object of the invention is the provision of an improved machine tool as defined in the two preceding paragraphs and in which means are provided for either manual or automatic control thereof.

The invention further resides in certain novel features of construction and combination and

2 arrangement of parts, and further objects and advantages will be apparent to those skilled in the art to which the invention pertains from the following description of the present preferred embodiment thereof described with respect to the accompanying drawings in which similar reference characters represent corresponding parts in the several views and in which:

Fig. 1 is a perspective view of a rotatable turret type hobbing machine embodying the present preferred form of the invention, portions of the skirt or apron for the machine being broken away and certain parts being omitted for clarity of illustration;

Figs. 2A and 2B taken together constitute a fragmentary vertical sectional view through the machine shown in Fig. 1, substantially at the loading station thereof, with parts in elevation and with the tool or hobhead of the illustrated operational unit turned to a horizontal position to facilitate illustration;

Fig. 3 is a sectional view taken on the line 3—3 of Fig. 2B illustrating one of the units positioned for cooperation with the novel rapid traverse drive;

Fig. 4 is an enlarged fragmentary, sectional view taken on the line 4—4 of Fig. 3;

Fig. 5 is an enlarged fragmentary sectional view taken on the line 5—5 of Fig. 3;

Fig. 6 is an enlarged fragmentary side elevational view of a portion of the structure shown in Fig. 3 as seen from the right-hand side of that figure;

Fig. 7 is a sectional view taken substantially on the section line 7—7 of Fig. 2B;

Figure 12:
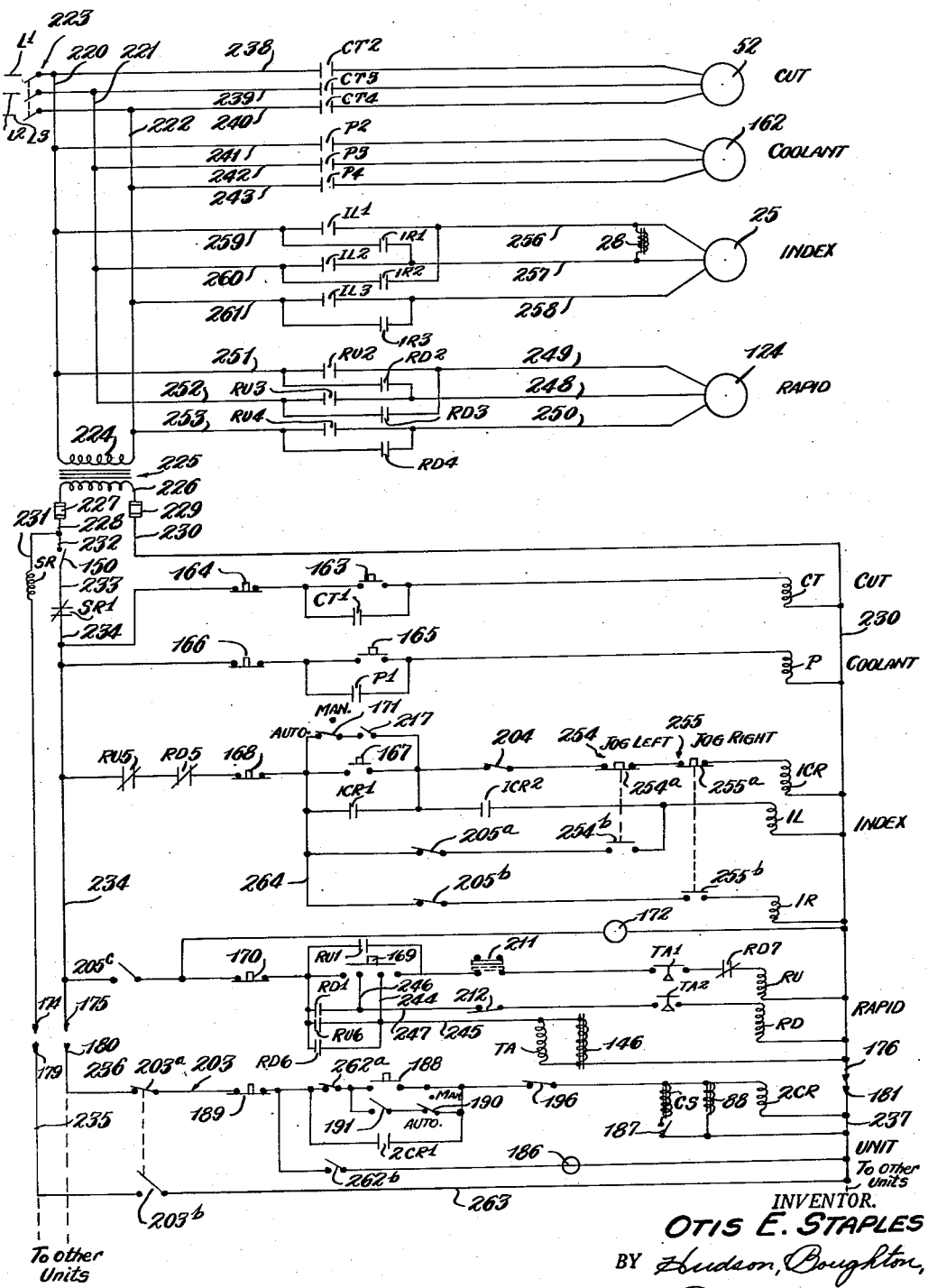
Figure 13:
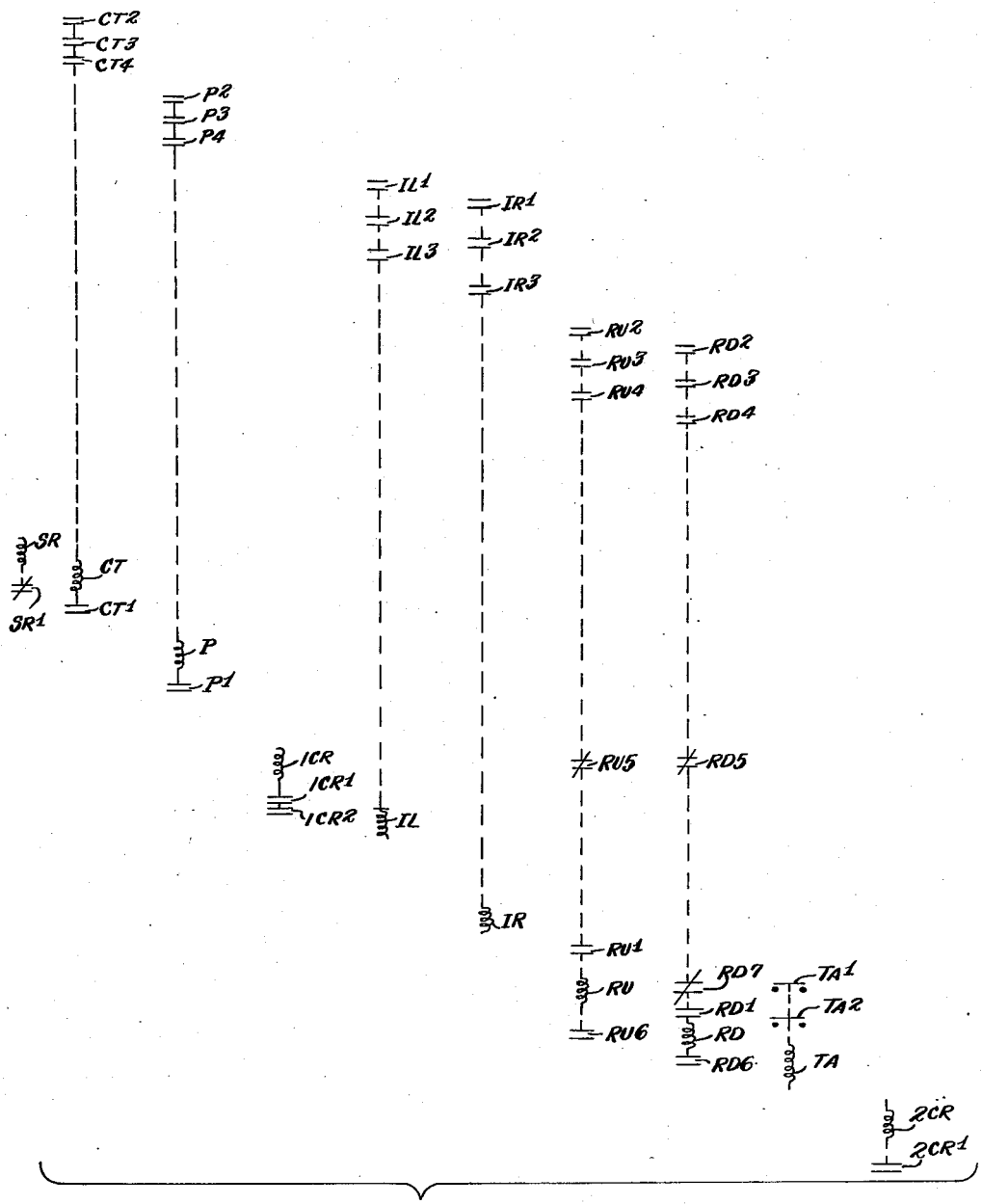

Fig. 12 is a simplified schematic wiring diagram of the controls for the machine; and, Fig. 13 is a key to the wiring diagram shown in Fig. 12, the key being so arranged that when Figs. 12 and 13 are placed side by side the relay coils and contacts in the key are horizontally aligned with the corresponding coils and contacts in the circuit diagram, the contacts actuated by each of the relay coils being vertically arranged in the key above or below the proper operating coil.

The invention is illustrated as embodied in a rotatable turret type hobbing machine similar to that illustrated in U. S. Patent 2,292,260, issued August 4, 1942, to Adams et al., and to the machine illustrated in my copending application S. N. 757,256, filed June 26, 1947, and hence only those parts of the machine are here illustrated and described which are considered necessary to convey a complete understanding of the invention to those skilled in the art.

Figure 1:
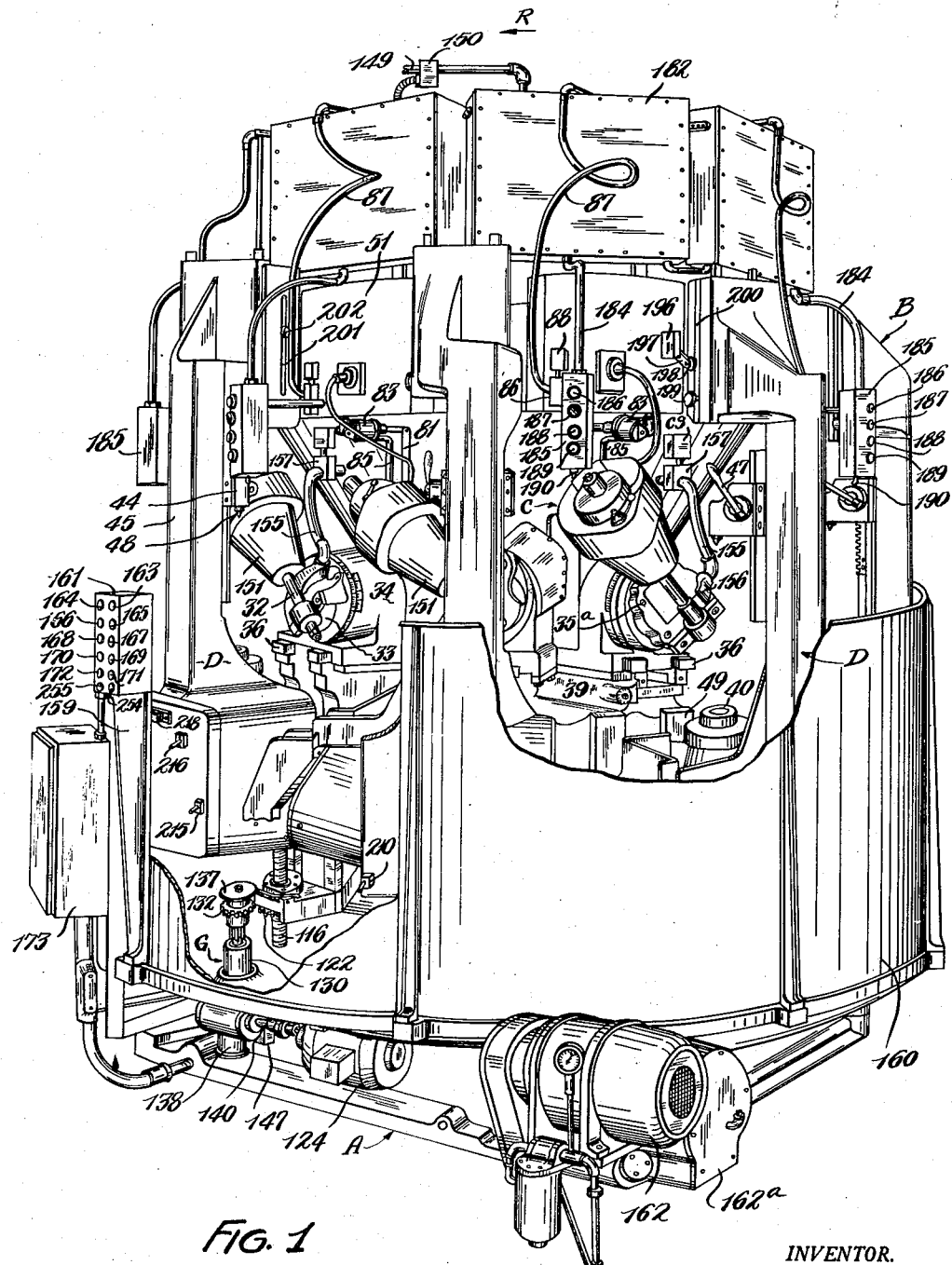
Figure 2A:
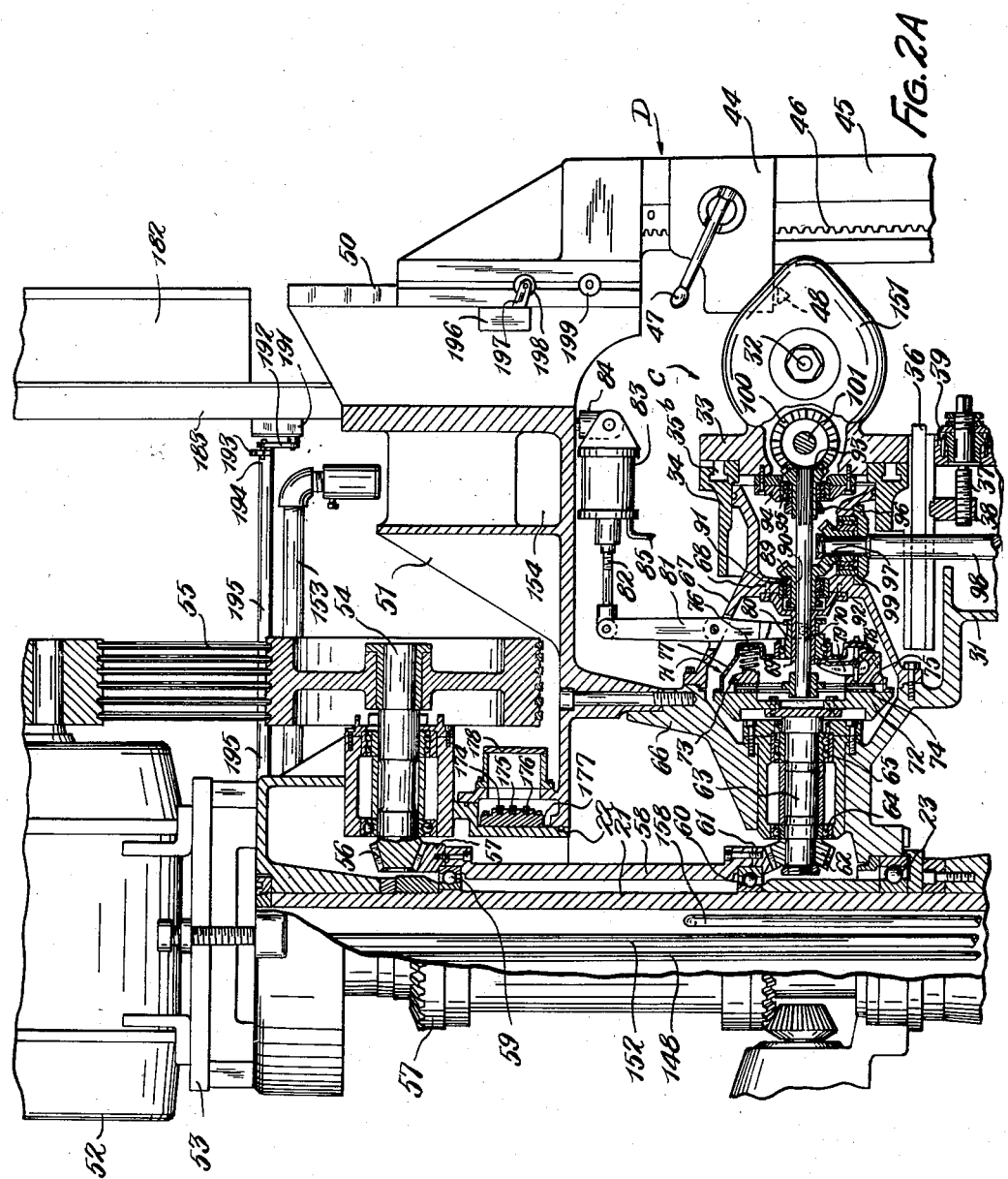

The general nature of the machine will be apparent from an inspection of Figs. 1, 2A and 2B, from which it will be seen that the machine is supported by a stationary frame A on which a turret B is mounted for rotation in the direction indicated by the arrow R. At spaced points about the turret are mounted a plurality of identical operational units comprising hobheads C and adjacent workheads D, the latter being slidably supported for vertical movement relative to the corresponding hobhead. Each hobhead is provided with mechanism for supporting and rotating a hob or other tool, the tool being adapted to be rotated about an axis extending transversely of the vertical movement of the adjacent workhead and preferably each hobhead includes mechanism for producing a relatively slow axial movement of the hob or other tool while the latter is rotating. Each workhead includes a means E for supporting and rotating a workpiece about a substantially vertical axis and mechanism F for producing a feeding movement of the workhead vertically during a cutting or hobbing operation. This rotation of the workpiece and feeding movement thereof is in timed relationship to the rotation of the hob or other tool, as will be readily apparent and hereinafter described. The machine also includes, in accordance with this invention, a single rapid traverse mechanism G for moving each workhead at a rapid rate when the corresponding operational unit is positioned at the loading station to thereby bring the work into cutting relationship with the hob or other tool and to return the workhead to its initial position after the cutting operation has been completed.

In operating the machine, the turret B thereof is rotated so that the operational units thereon successively pass a definite position known as the loading station where the workpieces are inserted and removed and rapid traverse movement of the workheads effected. The hobbing or other machining operation is effected, during normal operation of the machine, as the turret rotates, the cutting or hobbing operation being normally completed by the time a given workhead has returned to the loading station. The manner in which the various operations are effected and controlled will hereinafter become apparent from the following detailed description.

Figure 8:
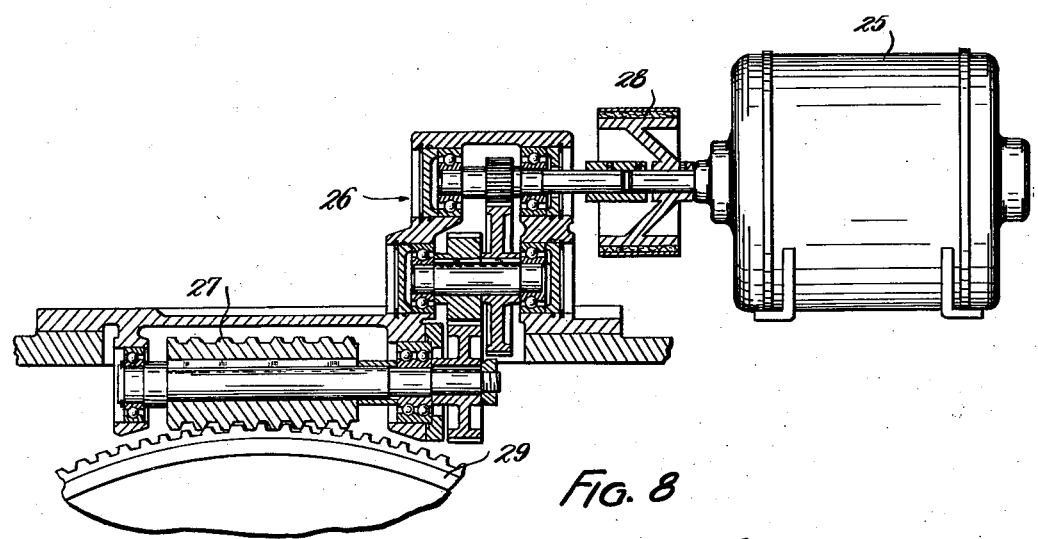
Fig. 8 is a fragmentary horizontal sectional view through a portion of the base of the machine showing the turret rotating means.

As shown in Figs. 1, 2A and 2B, the frame A comprises a base 20 and a central vertically extending column 21 united with the base and forming the main support for the machine. The turret B is rotatably supported upon the column and base by suitable bearings such as 22, 23 and 24. Rotation of the turret B is effected by means of a motor 25 (see Fig. 8) which operates through suitable reduction gearing 26 to rotate a worm 27, the shaft connecting the motor with the reduction gearing preferably being provided with a spring engaged, electrically released brake 28 for a purpose hereinafter mentioned. The worm 27 is in engagement with and drives a worm wheel 29 which is of large diameter and may be integral with or attached to a flange member 30. The member 30 is secured by bolts or other suitable means to the lower part of a vertically extending annular member 31 forming the main frame of the turret B.

Each of the toolheads C comprises a tool or hob spindle 32 rotatably supported upon a spindle member 33 which is in turn carried by a slidable head member 34. Each spindle member 33 is angularly adjustable relative to its head member 34 about an axis normal to the axis of the hob or tool spindle 32 and is secured to the head member 34 in any adjusted position by bolts 35A, the heads of which engage within arcuate T-shaped openings 35B in the front face of the member 34. The head members 34 are slidably supported upon horizontal ways 36 on the annular portion 31 of the turret and the head members are adjustable therealong radially of the axis about which the turret rotates. This adjustment is effected by means of screws 37, each of which engages a threaded member or nut 38 connected with the lower portion of the toolhead 34. The screws 37 are each journalled in a portion of the turret annular member 31 for rotation without axial movement. Consequently, when a screw 37 is turned the corresponding slidable head member 34 moves radially, the extent of movement being indicated by means of a dial 39 carried by the screw and cooperating with a stationary mark upon the turret.

Each of the workheads D is preferably provided with a suitable work holding and rotating means E. This comprises a work spindle 40 which is rotatably supported in the lower portion 41 of the workhead by suitable antifriction bearings such as 42 and 43. The upper end of each spindle is preferably provided with a chuck, not shown, and each of the workheads is further provided with a tail slide 44 which is slidably supported upon suitable ways on the vertical portion 45 of the workhead D. The slide 44 may be moved to an adjusted position and held therein by suitable mechanism comprising rack 46 and a handle 47 for operating a pinion, not shown, but which cooperates with the rack 46 as will be fully understood from the above-mentioned patent and my copending application S. N. 757,256. Each of the tail slides 44 is provided with a tail center 48 for engaging the work held on the work spindle 40. The workhead members D are slidably supported on vertical ways 49 and 50 provided on the annular member 31 and a cap member 51, respectively, said cap member being integral with, or secured to, the top of the annular member 31 so as to form a portion of the turret. Movement of the workhead D along the ways 49 and 50 is effected by mechanism hereinafter described.

The hob and work spindles 32 and 40, respectively, are rotated in predetermined timed relationship by a motor 52, hereinafter referred to as a "cut" motor, which is supported upon an adjustable platform 53 on the top of the column 21, see Fig. 2A. This motor is operatively connected to a shaft 54 through a flexible drive 55, the shaft 54 being journalled in a stationary portion of the housing connected with the column 21. The inner end of the shaft 54 is provided with a bevel gear 56 meshing with a ring-shaped bevel gear 57 connected to the upper end of a rotatable sleeve 58, the latter being rotatably supported by bearings 59 and 60 upon the column 21. The lower end of the sleeve 58 has a ring-shaped bevel gear 61 attached thereto which meshes with and drives a plurality of spaced bevel pinions 62, there being one such bevel pinion 62 for each operational unit mounted upon the turret. Each pinion 62 is keyed to a short shaft 63, rotatably supported by bearings such as 64, 65 in the rear portion 66 of a two-part housing attached to the member 31 and cap portion 51 of the turret B adjacent the edges of an opening therethrough. The driving connections to the various operational units from the gear 61, through the gears 62 and shafts 63, are duplicates and therefore only one will be described in detail.

As shown in Figs. 2A and 2B, the forward portion 67 of the previously mentioned two-part housing extends into the hollow interior of the head member 34. This portion of the housing is provided with an internal shoulder or flange 68 to the rear of which is connected a flanged member having an integral sleeve 69. A shaft 70 is journalled in the sleeve 69 and extends forwardly and rearwardly therebeyond, this shaft being selectively operatively connected with the shaft 63 by means of a friction plate clutch 71. This clutch is of conventional design and comprises a driving member 72 connected to the shaft 63 and a driven member 73 connected to the shaft 70. The cooperating faces of the members 72, 73 are supplied with friction material 74, 75 respectively and are normally forced into engagement by a plurality of spaced compression coil springs 76 exerting force between the rear of the driven member 73 and a housing member 77. The rear face of the driven member 73 is provided with a plurality of integral bosses, only one of which is shown, in each of which is mounted an axially extending rod 78. Pivoted to each rod 78 is a radially extending actuating lever 79 which is urged to the illustrated position by the springs 76 since the lower portion of each lever engages a cam surface in a recess provided in each of the integral bosses on the rear of the driven member. This action may be assisted, if desired, by providing each lever 79 with an auxiliary spring, not shown. The upper portions of the levers 79 extend adjacent the shaft 70 and are adapted to be rocked by an annular member 80 which is rotatably and slidably supported upon the sleeve 69, the annular member 80 having a circumferentially extending groove or recess thereabout engaged by shoes in the lower ends of a bifurcated lever 81 straddling the said annular member. The lever 81 is pivoted intermediate its ends to the forward portion 67 of the two-part housing, the lever extending through an opening in this housing.

The upper end of the lever 81 is pivotally connected to a rod 82 which has a threaded connection with a piston rod the latter, in turn, being connected with a piston, not shown, within the cylinder 83. The cylinder 83 is supported upon the cap member 51 of the turret by any suitable means such as, for example, by the depending lug or bracket 84. The lever 81 is adapted to be moved in a clockwise direction as viewed in Fig. 2A by the application of fluid pressure to the rear of the cylinder 83 through a flexible pipe or hose 85, the forward portion of the cylinder being provided with an exhaust port, not shown, communicating the area in front of the piston with the atmosphere.

The flow of fluid under pressure to the cylinder 83 is controlled by a two-way valve 86 (see Fig. 1) mounted upon the cap member 51 of the turret. The previously mentioned hose 85 is connected to this valve 86 which is also provided with a fluid pressure supplying pipe or hose 87. The pipe 87 is connected with a spider, not shown, which is rotatable with the turret relative to a stationary pipe 149 connected to a source of supply of fluid under pressure. The valve 86 has an exhaust port preferably provided with an adjustable orifice controlled by a needle valve or the like, not shown, which is more fully disclosed in the previously mentioned copending application S. N. 757,256. The movable member of the valve 86 is connected by an actuating member or rod to the armature of a solenoid or electromagnet 88, the valve 86 being so formed that when the solenoid 88 is energized communication is established between the fluid supply pipe or hose 87 to the pipe or hose 85, thus supplying fluid pressure to the cylinder 83 in a direction rocking the lever 81 clockwise as viewed in Fig. 2A. Under such action, the levers 79 are rocked in a direction moving the driven member 73 from engagement with the driving member 72 thus disengaging the clutch.

When the solenoid 88 is deenergized, the movable member of the valve 86 is actuated to interrupt communication between the pipes or hoses 87 and 85 and to establish communication between the pipe or hose 85 and the exhaust port of the valve 86. Hence, the springs 76 of the clutch 71 now act through the driven member 73 upon the levers 79 and the annular member 80 to rock the lever 81 in a counterclockwise direction. This moves the piston of the cylinder 83 to the left, as viewed in Fig. 2A, thus discharging the fluid in the cylinder through the pipe or hose 85, valve 86, and the exhaust port of the latter. The provision of an adjustable orifice for the valve 86 controls the rate of discharge of the fluid and hence the rate of engagement of the driven member 73 of the clutch with the driving member 72 under the action of the springs 76, thus preventing grabbing. The clutch of each operational unit is similarly constructed and controlled and the manner in which the solenoids 88 are energized and deenergized during the working cycle of the machine to effect operation of the clutches will be described hereinafter.

A bevel 89, provided with an integral sleeve 90, is keyed to the shaft 70 intermediate the ends of the latter. The sleeve 90 is journalled by bearings 91 in the shoulder or flange 68 of the forward portion 67 of the two-part housing, the sleeve 90 and hence the gear 89 being held against axial displacement by a nut 92 threaded upon the outer end of the sleeve and engaging the adjacent face of the inner race for the bearings 91. The outer end of the shaft 70 is splined and provided with a bevel gear 93 which is slidably keyed to the splined portion of the shaft. The gear 93 is provided with an integral sleeve portion rotatably supported in a member 94 by bearings 95. The member 94 is connected with the spindle supporting member 33 and the sleeve of the gear 93 is held from axial displacement with respect thereto by means of a nut 96 provided upon the threaded outer end of the sleeve.

The bevel gear 89 meshes with a bevel gear 97 connected with the upper end of a vertical shaft 98, the latter being journalled by bearings 99 in an opening in the lower side of the forward portion 67 of the two-part housing. This shaft 98 forms a part of the work spindle rotating and feeding mechanism which will be subsequently described in detail. The gear 93 is in mesh with another bevel gear 100 mounted upon a shaft 101 and forming a part of the drive for rotating and axially moving the tool or hob spindle 32. It will be apparent therefore that when the clutch 71 is engaged the shaft 63, rotated by the cut motor 52 through the gears 56, 57, 61 and 62, will drive the shaft 70, thus rotating the shafts 98 and 101 for rotating and feeding the work spindle and for rotating and axially moving the tool spindle, respectively. Conversely, disengagement of the clutch 71 interrupts rotation of the shaft 70 simultaneously stopping the mechanisms driven thereby.

As shown in Fig. 2B the lower end of the shaft 98 is splined and passes through a bevel gear 102 keyed to the splined portion of the shaft 98 and rotated thereby. The gear 102 is rotatably supported within a housing forming a part of the lower portion 41 of the workhead, the gear being held against axial displacement with respect to the housing while the splined portion of the shaft 98 permits the workhead to be moved relative to the latter. The gear 102 is in mesh with a bevel gear 103 provided on the end of a horizontally extending shaft 104 rotatably journalled in the lower portion of the workhead 41 by bearings such as 105, 106. The end of the shaft 104, opposite that provided with the gear 103, extends into a gear box forming a part of the portion 41 of the workhead and provided with a removable cover 107. Within this gear box are provided suitable change gears 108 for effecting rotation of the work spindle 40, these gears driving a worm 109 in mesh with a worm wheel 110 keyed to the work spindle 40. The details of this drive can be readily determined from inspection of Fig. 7 and further details can be found by reference to either of the Adams et al. patents, 2,048,173 or 2,292,260.

The lower end of the work spindle 40 is provided with a pinion 111 driving a gear 112 provided upon a stub shaft 113. The gear 112 is integral with or connected for rotation with a gear 114, the latter being in mesh with a gear 115 keyed to an elongated screw 116. The screw 116, hereinafter called the "feed" screw, has its upper end rotatably supported in the lower part of the workhead by bearings 117 and is held from axial displacement with respect thereto by means of a nut 118 and an integral shoulder cooperating with the bearings and the gear 115, as will be readily apparent from Fig. 2B. The screw 116 is threadably received within a feed nut 119 rotatably supported by bearings 120 in a bracket member 121 connected with the lower portion of the annular member 31. The feed nut is provided with a spur gear 122 keyed thereto for a purpose hereinafter described, the gear 122 and feed nut being held against axial displacement relative to the bracket 121 by means of a nut 123 threaded upon the lower portion of the feed nut 119.

It will be apparent from the structure thus far described, that rotation of the shaft 98 drives the gears 102, 103 thereby causing rotation of the shaft 104 and the gears 108 with the latter rotating the worm 109 and worm wheel 110, so that the work spindle 40, and the work supported upon the latter, are rotated. Rotation of the spindle 40 drives through the gears 111, 112, 114 and 115 to effect rotation of the feed screw 116. This causes elevation of the workhead when the gear 122, and hence the feed nut 119, are held from rotation as hereinafter described, the feed screw 116 threading through the feed nut for effecting this movement. Conversely, when the gear 122 is freed for rotation and the shaft 98 is not driven, the workhead may be moved vertically by rotating the gear 122 since at this time the feed screw will be held from rotation through the locking imposed by the worm and worm wheel 109, 110. Rotation of the feed nut 122 can be at a relatively rapid rate for effecting rapid traverse movement of the workhead.

In accordance with this invention a novel mechanism is provided for effecting rapid traverse movement of the workhead through rotation of the gear 122 at the loading station for the apparatus by employing a single drive motor which selectively cooperates with each of the operational units as they are sequentially positioned at the loading station. For this purpose, the base 20 of the machine is provided with a reversible electric motor 124, the armature shaft of which is connected with a helical gear 125, see Figs. 2B and 3. The gear 125 is in mesh with a helical gear 126 keyed upon a hollow spindle 127 projecting upwardly through an opening in the base of the apparatus at the loading station adjacent the gears 122 of the operational units. The spindle 127 is rotatably supported, as by bearings 128 and 129, in a housing 130 which, as shown, encloses the gears 125, 126 and is affixed to the base of the machine. The upper portion of the spindle 127 is splined and has the elongated hub 131 of a gear 132 keyed thereto. This gear 132 is adapted to mesh with the gear 122 on each of the feed nuts of each operational unit successively, but is normally held disengaged therefrom by means of a coil spring 133 acting between a seat in the upper end of the spindle 127 and a shoulder or collar 134 provided upon a rod 135 extending through the hollow interior of the spindle 127. Intermediate the collar or shoulder 134 and the hub of the gear 132 is provided an antifriction bearing 136, the latter being held in place by a disk member 137 secured to the outer end of the rod 135 and having a function hereinafter described. The lower end of the rod 135 is connected to a piston within a cylinder 138, the latter being secured to the lower portion of the housing 130 and being provided with a fluid pressure inlet port 139 and an exhaust port 140.

Referring now to Figs. 3 through 6, it will be observed that the bracket 121, which supports the feed nut 119 and the gear 122, has an upstanding ear or flange 141 spaced from a vertical planar portion of the bracket, thereby providing a substantially rectangular recess therebetween. A lever 142 is pivotally mounted within this recess by means of a pivot pin 143 passing through the lever and received within the bracket 121 and its ear 141, as will be apparent from Figs. 3 and 4. The lever 142 is curved as will be apparent from Figs. 3 and 4 and has its forward end 144 extending through a slot or opening in the bracket 121, the lower end of this portion 144 of the lever being provided with a pin 145 which is adapted to extend between adjacent teeth of the gear 122 when the lever 142 is in its normal position. The rear portion of the lever 142 extends beneath the previously mentioned disk 137 provided on the rod 135 and is adapted to be engaged by the latter for removal of the pin 145 from between the teeth of the gear 122.

The construction just described is such that with the parts disposed as shown in Fig. 2B the pin 145 is between two adjacent teeth of the gear 122, thus preventing rotation of the latter and hence of the feed nut 119. Consequently, when the clutch 71 is engaged the resulting rotation of th feed screw 116 causes vertical movement of the workhead at a relatively slow or feeding rate of movement. Conversely, when the clutch 71 is disengaged so that the feed screw 116 is held stationary through the locking action of the worm 109 and worm wheel 110, the workhead of a given operational unit may be moved at a relatively rapid rate in a vertical direction hereinafter called the "rapid traverse" movement through operation of the motor 124 and the fluid pressure cylinder 138. That is to say, the application of fluid pressure to the cylinder 138 through the inlet 139 causes the rod 135 to be moved downwardly compressing the spring 133. This brings the disk 137 into engagement with the rear portion of the lever 142 tilting the said lever and thereby disengaging pin 145 from between the teeth of the gear 122 so that the latter and the feed nut 119 are now freely rotatable. As the rod 135 continues to move downwardly under action of the cylinder 138, it carries the gear 132 into meshing engagement with the gear 122 of the operational unit then positioned at the loading station. Consequently, when the motor 124 is now energized, the gear 132 rotates gear 122 and feed nut 119, thereby moving the workhead in a vertical direction at a relatively rapid rate. This rapid rate of movement is terminated upon deenergization of the motor 124 and termination of the application of fluid pressure to the cylinder 138. When the fluid pressure is no longer supplied to the cylinder 138, the spring 133 disengages the gear 132 from the gear 122 thereby terminating rotation of the latter and the upward movement of the disk 137 allows the forward end of the lever 142 to again drop to the illustrated position with the pin 145 between the adjacent teeth on the gear 122, thus preventing rotation of the gear 122 and feed nut 119.

As heretofore mentioned, there is but a single rapid traversing mechanism for all of the oper- tional units of the machine. This rapid traverse mechanism successively cooperates with each of the operational units as the turret is rotated or indexed with respect to the frame of the machine, the rotation or indexing of the turret being terminated as each operational unit is positioned at the loading statoin in proper alignment with the rapid traverse mechanism for operation thereby. Control of the indexing or rotation of the machine and the feed or rapid traverse movements of the workhead are electrically governed by suitable switches as is hereinafter described in detail. The application of fluid pressure to the cylinder 138 is also electrically controlled by means of a solenoid 146 actuating a conventional valve 147 governing the application of fluid pressure from the supply pipe such as 148 connected to the main supply pipe 149. The valve 147 is of conventional construction and hence is not illustrated nor described in detail.

As mentioned heretofore, the disengagement of the clutch 71 as well as the engagement of the rapid traverse mechanism G are effected by fluid pressure operated mechanism. This mechanism may be either hydraulic or pneumatic in nature and supplied from any suitable source such as a reservoir and pump located in the base of the machine. As shown in the drawings, however, air pressure is utilized and supplied to the machine from an outside source of supply, such as the air line commonly provided in factories for cleaning purposes or the like. The air under pressure is conducted from such source of supply to the machine at the top thereof through the previously mentioned stationary pipe 149. The supply pipe or hose 149 is preferably provided with a pressure responsive electrical switch 150 connected in series in the control circuit for the apparatus to thereby prevent operation of the entire apparatus in the event there is a failure of air pressure, which failure would cause improper engagement of the clutch 71 and failure of the rapid traverse mechanism to operate properly.

It has been previously stated that the hob or tool spindle 32 is rotated when the clutch 71 is engaged and in addition to its rotation this spindle is given a slow axial movement to thereby evenly distribute the wear on the hob or tool throughout the axial length of the latter. The mechanism for accomplishing this rotation and axial feed of the hob is contained within the housing 151 and is driven by the shaft 101. This mechanism may be either of the type disclosed in my copending application S. N. 757,256, filed June 26, 1947, or the copending application of Staples et al., S. N. 56,726, filed October 27, 1948. In view of the fact that these mechanisms for axially moving the hob are fully disclosed and claimed in the said copending applications and since this feature per se is not a part of the present invention, the details thereof need not be described. Suffice it to note that the mechanism includes a microswitch, hereinafter referred to in conjunction with the operation of the machine, for preventing the resumption of a new cycle of operation for a given operational unit of the machine when the hob spindle thereof has been shifted its maximum extent, an indicating light being provided to advise of this fact.

In addition to the above mentioned features, the machine is also provided with a coolant system for supplying a cutting or cooling liquid to the hobs or tools during a machining or hobbing operation. The coolant or cutting liquid is supplied from a reservoir within the base of the machine by means of a pump connected to a conduit 152 extending upwardly through the column 21 of the machine. The conduit 152 is connected to a pipe 153 which discharges into a trough reservoir in the cap member 51 of rotatable turret (see Fig. 2A). Equally spaced pipes 155, one for each unit, conduct the coolant or cutting fluid from the trough 154 to nozzle members 156 adjacent the hog or tool spindles of the units. These nozzle members are so directed that the coolant or cutting fluid will flow over the hob or other tool and the work being cut thereby, the liquid being returned to the base of the machine by gravity for cleaning and further circulation. Intermediate its nozzle 156 and the reservoir 154, each of the pipes 155 is provided with a valve 157 actuated by a solenoid CS (see Figs. 1 and 12) so that coolant is allowed to flow only when a cutting operation is being performed and is automatically terminated when that operation has been completed. Lubrication for the machine is provided by a circulating system of conventional design, the vertical supply pipe 158 of which extends through the hollow column 21, see Figs. 2A and 2B.

The base 20 of the machine is provided with a vertically extending standard 159 adjacent the loading station, the latter being formed by reducing the height of a portion of the apron or skirt 160 surrounding the base of the machine. Adjacent the top of the standard 159 is mounted a switch box 161 provided with switches for controlling the rotation or indexing motor 25, the cut motor 52, the rapid traverse motor 124, and the motor 162 for the coolant pump 162a. For this purpose, the switch box 161 is provided with manually operated start button 163 and stop button 164 for the cut motor 52; start button 165 and stop button 166 for the coolant pump motor 162; start button 167 and stop button 168 for the index or rotation motor 25; start button 169 and stop button 170 for the rapid traverse motor 124; and jog switches 254 and 255 for the index motor 25. In addition, the box 161 is provided with a two-position, manually operated switch 171 adapted to be set in either manual or automatic position and thereby condition the machine for either manual or automatic control. Adjacent the switch 171 is provided a signal light 172 which, when illuminated, indicates that one of the operational units is properly positioned at the loading station for effecting loading and unloading of the work and rapid traverse of its workhead. The electrical interconnections of the switches operated by the push buttons just mentioned and their cooperating circuits are schematically represented in Fig. 12, which also shows a schematic representation of the electrical circuits for one unit of the hobbing machine. The relays and circuits controlled by the switches 165 to 171, 254 and 255 are enclosed in a main control box 173 mounted upon, or adjacent to, the standard 159.

Electrical power is conducted to each of the operational units rotating with the turret B by collector rings 174, 175, 176 and brushes 179, 180, 181 schematically indicated in Fig. 12. The collector rings 174, 175, 176 are preferably supported upon the upper portion of the column 21 upon an insulating mounting 177 secured to a bracket or depending member adjacent the rotating cap 51 of the turret, see Fig. 2A. A suitable housing 178 provides a cover for the collector rings and brushes. The brushes conduct the electrical power from the collector rings 174, 175, 176 to separate electrical control circuit for each unit which are enclosed in separate control cabinets or boxes 182 (see Fig. 1), there being a separate box for each unit supported to rotate with the turret by suitable standards such as 183 extending upwardly from the cap member 51, see Fig. 2A.

Depending from each cabinet 182, as by means of a suitable electrical conduit or pipe 184, is a station or unit switch box 185 provided with the previously mentioned indicating light 186 associated with the hob shifting mechanism. In addition the unit box 185 is also provided with switch operators 187, 188 and 189 for controlling the coolant valve and the starting and stopping of a hobbing operation, respectively. A toggle switch 190 is mounted at the bottom of the box 185 to selectively condition the unit for either manual or automatic operation, as hereinafter described.

Each operational unit is provided with a rotation controlled switch 191 which may be conveniently mounted on the rear surface of one of the cabinets 182 or of the supporting standards 183 therefor, see Fig. 2A. These switches are of the type which are spring-urged to circuit opening position and each is provided with a rocking arm 192, the outer end of which has a roller 193 thereon extending into the path of a single stationary cam 194. This cam is mounted on the outer end of an elongated rod or bar 195 positioned adjacent the loading station for the machine and having its inner end supported upon the stationary top of the machine between the motor support 53 and the hollow spindle 21. Hence, as the turret of the machine begins to rotate when each unit leaves the loading station, the corresponding switch 191 is operated momentarily to closed position by the cam 194. The switch is returned to open position as soon as the roller thereof has passed the cam as the turret continues to rotate.

On the outer surface of the cap member 51 of the turret, adjacent the top portion of each workhead D, is provided an electrical switch 196. This switch is provided with a rocking arm 197 having a roller 198 extending in the path of an adjustable abutment or button 199. The abutment or button 199 is slidably disposed within a slot 200 extending vertically of the upper portion of the workhead D, the button or abutment being secured in any adjusted position therealong. The switch 196 is of the type such that it normally remains in the position to which it is actuated by engagement of the button or abutment 199 with its roller 198, the relationship of the parts being such that the arm 197 may move sufficiently to allow the button or abutment to pass thereby. The opposite side of the top of the workhead is likewise provided with a slot 201 (see Fig. 1) in which one or more abutments or buttons 202 may be adjustably positioned for cooperation with an overtravel limit switch. This latter switch is preferably enclosed within the upper part of the workhead, being schematically indicated at 203 in Fig. 12.

The portion of the skirt or apron 160 adjacent the loading station of the machine is provided on its inner surface with a plurality of electrical switches for cooperation with switch operators carried by each of the operational units as the latter are rotated by the turret. In the form shown in the drawings, the switch operators are provided upon the lower portion of the workheads of the operational units and preferably upon the removable cover 107. The switches upon the apron are preferably adjustably mounted thereon and include a switch 204 for terminating energization of the index or rotation motor 25 as the turret is moved to the loading station. A switch 205 is positioned adjacent the switch 204 for conditioning the unit of the apparatus to begin a machining operation, the switch 205 being so positioned that it is contacted and operated only when the unit is properly positioned for engagement of its gear 122 with the gear 132 of the rapid traverse mechanism. Preferably each of the switches 204, 205 is provided with an elongated bar such as 206, 207, respectively, having guide pins such as 208, 209 extending through slots in the apron or shield to permit adjustment of the switch and actuating bars while at the same time preserving the said bars in proper vertical position. The bars 206, 207 are adapted to be engaged and actuated sequentially by a single actuator in the form of a rod or bar 210 provided upon the lower portion of the workhead D, see Figs. 2B, 7, 9 and 10.

Figure 9:
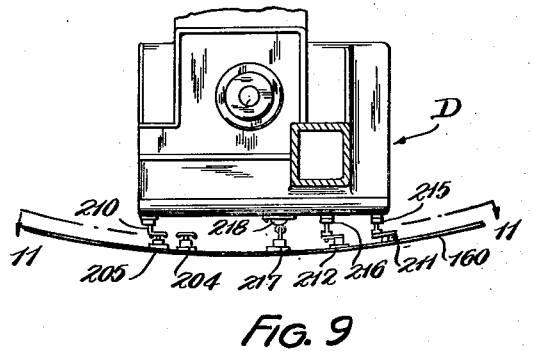
Fig. 9 is a sectional view through the bottom of the workhead of one of the operational units of the machine positioned at the loading station, the cooperating portion of the apron or skirt of the machine being shown in top elevation.
Figure 10:
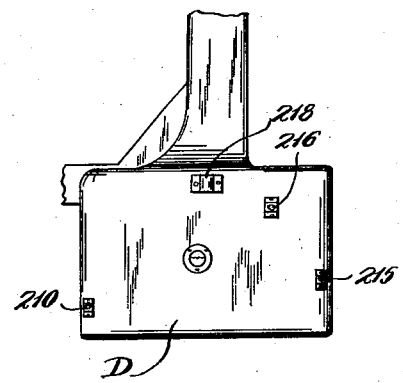
Fig. 10 is a fragmentary front elevational view of the portion of the workhead shown in Fig. 9 illustrating the positions of the switch actuators.
Figure 11:
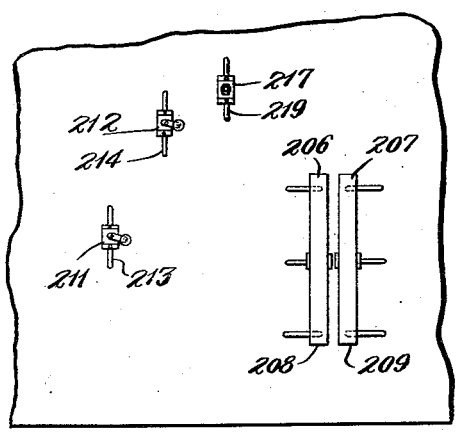
Fig. 11 is a fragmentary rear elevational view of the portion of the apron or skirt of the machine at the loading station, the view being taken from within the apron or skirt as indicated by the line 11—11 of Fig. 9.

The apron or skirt 160 is also provided at the loading station with electrical switches 211 and 212 which may be adjustably positioned relative to the skirt or apron by suitable mounting screws passing through slots 213, 214 in the apron as will be seen from Fig. 11. The switch 211 is adapted to be actuated by an abutment member or arm 215 provided adjacent the lower portion of the workhead on the opposite side thereof from the switch actuator 210 as shown in Figs. 9 and 10. Switch 212 is adapted to be actuated by an abutment member or arm 216 provided upon the workhead at a slightly higher elevation than the switch 215 and to one side thereof as is also indicated in Figs. 9 and 10. Intermediate the switches 212 and 204 is provided an additional switch 217 adapted to cooperate with and be operated by an actuator or cam 218 of relatively large surface provided substantially centrally upon the lower portion of the workhead D. Switch 217, like the switches 211 and 212, is mounted for vertical adjustment by means of a slot 219 in the skirt or cover 160. The several switch actuators 210, 215, 216 and 218 are also preferably adjustably mounted on the cover 107 of the workhead. The relationship of the several switches and the actuating arms therefor, when the operational unit is properly positioned at the loading station is indicated in Fig. 9.

Referring now to Fig. 12, it will be seen that power is provided to the power supply lines 220, 221 and 222 of the machine from mains L1, L2 and L3 through a disconnect switch 223. The supply lines 220, 221 and 222 are connectible to provide power for operating the cut motor 52, coolant pump motor 162, the index or rotation motor 25, and the rapid traverse motor 124, as hereinafter described. In addition, the wires 220 and 222 are connected to the primary 224 of a transformer 225, the secondary 226 of which supplies the current for the control circuits of the apparatus. Thus, one terminal of the secondary 226 is connected through a fuse 227 to a power supply line 228 while the other terminal of the secondary 226 is connected through a fuse 229 to the power supply line 230 for the control circuit. The wire 228 is connected by a wire 231 to one terminal of the coil of a relay SR, the other terminal of which coil is connected to one of the collector rings such as 174. Wire 228 is also connected to a wire 232 which is in turn connected with one terminal of the switch 150 provided in the air supply pipe 149. The other terminal of this switch is connected by a wire 233 to one terminal of the normally closed contacts SR1 of relay SR, the other terminal of these contacts being connected to a wire 234 between which and the wire 230 are connected the several switches and relays for controlling operation of the apparatus.

The wire 234 is connected to the collector ring 175 and the wire 230 is connected to the collector ring 176, while wire 231 is, as previously mentioned, connected to the collector ring 174. The brushes 179, 180 and 181 cooperating with the collector rings 174, 175 and 176 are connected to the control circuits for the separate operational units through the wires 235, 236 and 237, respectively. Since the circuits for the several units are identical only one is illustrated in Fig. 12.

The connections of the several switches and relays comprising the control circuit for the apparatus and which are connected with the previously mentioned wires 230, 231, 234, 235, 236, and 237 can best be understood in conjunction with a description of an operating cycle of the machine when read in conjunction with Figs. 12 and 13. It should be noted that Fig. 13 comprises a key for Fig. 12 such that when the two figures are placed side by side in alignment, the relays and contacts in Fig. 12 are in horizontal alignment with the corresponding relays and contacts in Fig. 13 and the contacts associated with and operated by a given relay coil are in vertical alignment with each other and with that coil in Fig. 13 being interconnected by broken lines. By keeping Fig. 13 horizontally aligned with Fig. 12 the location in the wiring circuit of any contact or operating coil for a given relay can be readily determined.

OPERATION
Automatic

The machine of this invention is ordinarily intended to be operated in an automatic manner; that is to say, each operational unit of the machine will automatically effect a machining operation upon a workpiece placed therein upon actuation of a push button for that unit. Upon operation of the said push button, the workhead will rapid traverse the work into cutting or hobbing relationship with the tool upon the tool spindle, whereupon the rapid traverse movement is automatically terminated. Thereafter, the workhead is moved at the feeding rate for engagement with the tool of that unit, the tool and workpiece being supplied with coolant. The vertical movement of the workhead also operates a switch to automatically begin indexing or rotation of the turret, thus moving the latter to bring a new operational unit into position at the loading station where the steps of inserting the workpiece and starting the operational movements are repeated as before, the previously started unit continuing its machining operation whether or not the turret be in rotation or stationary. As each unit returns to the loading station, after a complete revolution of the turret, it will again be automatically positioned for cooperation with the rapid traversing mechanism, the machining operation having been completed before this repositioning so that the feeding mechanism is no longer operating to move the workhead vertically. As the workhead comes to rest at the loading station, momentary actuation of the start switch for the rapid traverse motor returns the workhead to its initial position and a new cycle may then be started.

In initially preparing the machine for operation as above summarized, the operator will initially close the disconnect switch 223 and see that air under pressure is being supplied through the conduit or pipe 149, thus closing the switch 150. Moreover, he will see that each of the workheads for each of the operational units has not been positioned beyond its permissible limits of travel so that contact 203a of the overtravel switch 203 is closed and contact 203b of that switch is open. The operator will also position the switch 171 on the main control station 161 to its automatic position and move the toggle switch 190 of each operational unit to its automatic position. As each unit is sequentially brought to the loading station, the operator closes the switch 187 thereof in the circuit of the solenoid CS controlling the coolant valve, and moves the toggle switch 190 of that unit to its automatic position.

The operator also momentarily depresses start button 163 for the cut motor 52. Since the switch 223 has been previously closed, the transformer 225 is now energized through power flowing in the lines 220 and 222. Moreover, since the workheads are all positioned intermediate their overtravel limits, the relay SR is not energized so that its contacts SR1 are closed. Moreover, since air under pressure is supplied through the pipe 149, pressure responsive switch 150 is closed. Consequently, operation of the switch 163 closes the circuit from the wire 234 through the normally closed stop switch 164 and the now closed start switch 163 to and through the coil of the relay CT to the wire 230. This energizes the relay CT causing it to close its contacts CT1, CT2, CT3 and CT4. Closing of the contacts CT1 provides a holding circuit around the start switch 163 so that the relay CT remains energized when the switch 163 is released. Closing the contacts CT2, CT3 and CT4 energizes the cut motor 52 through wires 238, 239 and 240 connected with the power lines 220, 221, and 222, respectively.

The cut motor 52, positioned at the top of the apparatus, is therefore placed in operation, thereby rotating the shafts 63 for the operational units. This does not, however, result in any movement of the workheads or rotation of the tool spindles 32, since the clutches 71 are all disengaged due to the application of the fluid pressure to the cylinders 83, the solenoids controlling these valves being deenergized at this time.

The operator next momentarily actuates switch 165. This completes a circuit from the wire 234 through the normally closed switch 166, the now closed switch 165, and the coil of a relay P, the circuit being completed to the wire 230. Relay P is therefore energized, closing its normally open contacts P1, P2, P3 and P4. Closing the contacts P1 provides a holding circuit for the relay P maintaining the latter energized when the switch 165 is released. Closing the contacts P2, P3 and P4 energizes the motor 162 for the coolant pump through the wires 241, 242 and 243, connected respectively with the power supply lines 220, 221 and 222. The pump for the coolant consequently supplies this liquid through conduit 152 and pipe 153 to the reservoir 154 in the turret cap 51. No coolant is, however, supplied through the nozzles 156 since the valves 157 for the coolant supply pipes 155 are now closed.

During normal operation of the machine under automatic control, the turret of the machine normally comes to rest as each operational unit is sequentially located at the loading station whereupon the completed workpiece is removed and the workhead rapidly traversed to its lowermost position. Therefore, assuming that an operational unit is thus properly positioned at the loading station and its workhead is at its uppermost position, the bar 207 will be engaged by the rod or actuator 210 as shown in Fig. 9, thereby holding switch 205 actuated so that its normally closed contacts 205a and 205b are opened and normally open contact 205c is closed. The switch 211 will be in open position having been actuated thereto by the former upward movement of the workhead. Switch 212 will, however, be in closed position since it is normally closed and the rod or actuator 216 is not now in engagement therewith.

The closing of contact 205c completes a circuit therethrough to and through the indicating lamp to the wire 230. The resulting lighting of lamp 172 indicates that an operational unit is properly positioned at the loading station. Consequently, a momentary depression or operation of the push button 169 will complete a circuit from the wire 234 through the now closed contact 205c, through the normally closed stop switch 170, to the switch 169. This circuit continues through switch 169 and wires 244 and 245 to the solenoid 146 for the valve 147 controlling shifting of the driving gear 132 for the rapid traverse mechanism, the circuit being completed to the wire 230. The coil of a timing relay TA is connected in parallel with the solenoid 146, and is also simultaneously energized. Energization of the solenoid 146 moves the valve 147 to operated position, thereby permitting fluid under pressure to flow from the conduit 150 through the valve 147 into the inlet 139 for the cylinder 138. This causes the piston rod 135 to be moved downwardly, as viewed in Fig. 2B, thus bringing the gear 132 for the rapid transverse mechanism into engagement with the gear 122 on the feed nut 119 of the workhead positioned at the loading station. The downward movement of the rod 135 also causes the disk 137 thereof to engage the lever 142 thereby removing the pin 145 from between adjacent teeth of the gear 122.

The timing relay TA, which was energized simultaneously with the solenoid 146, is provided to close a circuit controlling energization of the rapid traverse motor 124 a predetermined time after the valve 147 is operated. This time delay is to insure that the pin 145 has been properly withdrawn from between the teeth of the gear 122 and that the gears 132 and 122 are properly engaged before the motor 124 is placed in rotation. The operation of the cylinder 138 is relatively rapid and hence the time delay interposed by relay TA is of relatively short duration and the operator will maintain the push button 169 depressed throughout this time interval. When the contact TA2 closes, at the end of this interval, a circuit is completed from wire 234 through the push button switch 169 and wire 246 to a wire 247, thence through the closed switch 212, now closed contact TA2, to and through the coil of a relay RD, the circuit being completed to the wire 230. Energization of the relay RD closes its normally open contacts RD1, RD2, RD3, RD4 and RD6 and opens its normally closed contacts RD5 and RD7. Closing of the contacts RD1 and RD6 provides holding circuits for the relay RD and for the solenoid 146 and relay TA, respectively, thus maintaining them energized after the push button 169 is released. Closing of the contacts RD2, RD3 and RD4 completes circuits to the motor leads 248, 249 and 250 for the rapid traverse motor 124 from the wire 251, 252 and 253 which are respectively connected with the power lines 220, 221 and 222. As mentioned heretofore, the operator maintains the switch 169 depressed until relay RD is energized by the delayed closing of the contact TA2. This interval is of relatively short duration and its termination is indicated by commencement of operation of the rapid traverse motor 124. The energization of relay TA has also closed its contacts TA1 at the end of the aforementioned time interval but no circuit is completed therethrough at this time since contacts RD7 are open. Improper rotation of the turret at this time cannot occur since the contacts RD5 are held open.

Since the clutch 71 is still deenergized, the worm 109 is stationary so that the feed screw 116 is prevented from rotation. Hence, the energization of the rapid traverse motor 124 with resulting driving of gear 122 and rotation of the feed nut 119 at a relatively rapid rate, moves the workhead vertically downwardly, it being remembered that the motor 124 is energized through the contacts RD2, RD3 and RD4 in a direction which may be considered the reverse of its normal direction of rotation.

As the workhead moves downwardly, the rod or actuator 215 thereon resets the switch 211, moving its contact to closed position as indicated in broken lines in Fig. 12. This, however, completes no circuit at this time, since neither the switch 169 nor the contacts RU1 are closed. When the workhead reaches its lowermost position the rod or actuator 216 engages the operating arm for the switch 212, moving the latter to open position, thereby breaking the circuit through the relay RD. Deenergization of the relay RD opens its contacts RD1, RD2, RD3, RD4 and RD6 and closes its contacts RD5 and RD7. Opening of the contacts RD1 and RD6 removes the holding circuits for the relay RD, solenoid 146, and relay TA, while opening of the contacts RD2, RD3, and RD4 deenergizes the rapid traverse motor 124. Consequently, the valve 147 for the rapid traverse mechanism now moves back to its unoperated position, terminating the supply of fluid pressure to the cylinder 138 and placing the said cylinder in communication with the atmosphere. The spring 133 of the rapid traverse mechanism (see Fig. 2B) now moves the rod 135 upwardly disengaging the gear 132 from the gear 122 and removing the disk 137 from engagement with the lever 142, so that the pin 145 may now drop between adjacent teeth of the gear 122 holding the latter from rotation. It will be apparent from the mechanism illustrated and described that there is little tendency for the gear 122 to coast after driving force is removed therefrom by deenergizing the motor 124 and that the gear 122 will be stationary or substantially so when the pin 145 drops between the teeth thereof.

The workhead is now at its lowermost position at the loading station. The operator then places a new work blank or workpiece in the chuck on the work spindle 40 and engages the tail stock 48 therewith through proper positioning of the tail slide 44. The operator then again depresses start switch 169 at the main control station and holds the latter depressed until the motor 124 begins operation. This operation of the switch 169 closes a circuit from the wire 234 through the still closed contact 205c of the switch 205, switch 170 and the now closed switch 169, to the wires 244, 245 connected with the timing relay TA and the solenoid 146, the circuit being completed to the wire 230 as previously described. Now, however, the switch 212 is open and the switch 211 is closed. Therefore, although the solenoid 146 is energized operating the valve 147 for effecting engagement of the rapid traverse mechanism with the workhead feed nut as previously described, relay RD is not energized when the contact TA2 is subsequently closed. Instead, relay RU is now energized by the closing of the contact TA1, which is operated by the relay TA simultaneously with the contacts TA2. This circuit for the relay RU extends from the wire 234 through the closed contact 205C, switch 170, the now closed switch 169, closed switch 211, and the now closed contact TA1 to and through the relay coil RU to the wire 230. The energization of the relay RU closes its normally open contacts RU1, RU2, RU3, RU4, and RU6 and opens its normally closed contacts RU5. Closing of the contacts RU1 provides a holding circuit for relay RU about the start switch 169 so that the latter may now be released. Closing of these contacts RU6 provides a holding circuit for the relay TA and the solenoid 146 maintaining these energized when the switch 169 is released. Closing of the contacts RU2, RU3 and RU4 now energizes the rapid traverse motor 124 for rotation in a forward direction since the motor leads 248, 249 and 250 are now connected respectively with the power leads 252, 251 and 253. The opening of the contacts RU5 has interrupted a circuit to the controls for the indexing motor 25 thus preventing inadvertent operation of the latter.

It will be apparent therefore, that the workhead will now move upwardly at its rapid traverse rate bringing the workpiece closely adjacent the tool or hob carried on the spindle 32. When this position is reached the rod or actuator 215 will engage and operate the switch 211 from its broken line position as shown in Fig. 12 to its open position as shown in full lines in the same figure. This opening of the switch 211 deenergizes relay RU thereby causing it to open its contacts RU1, RU2, RU3, RU4 and RU6 and closes its contacts RU5. Opening the contacts RU1 and RU6 opens the previous holding circuit for the relay RU, TA and the solenoid 146. Consequently, the valve 147 is now positioned so that the fluid pressure is no longer supplied to cylinder 138, the latter being connected to atmosphere at this time with the result that the spring 133 disengages the rapid traverse driving mechanism as previously described, the motor 124 now being stationary since the contacts RU2, RU3 and RU4 have opened the energizing circuit for this motor. Also, the pin 145 is again positioned between adjacent teeth of gear 122.

During the upward movement of the workhead, as just described, and at about the time switch 211 is actuated, the cam 218 has engaged switch 217 closing the latter. This cam is preferably of sufficient length to provide for some movement of the workhead vertically without disengagement of the cam from the switch. The initial closing of the switch 217 does not immediately effect any operation since, as long as the switch 211 is closed and the RU relay is energized with resulting energization of the rapid traverse motor 124, the circuit through the switch 217 is open at the RU5 relay. However, when the switch 211 has been operated to open position, as previously mentioned, with the resulting deenergization of the RU relay, the RU5 contacts now close. This completes a circuit from the wire 234 through the normally closed contacts RU5, RD5, switch 168, the initially closed switch 171, the now closed switch 217 and through the normally closed switch 204, jog switches 254 and 255, to and through the relay 1CR, the circuit being completed therefrom directly to the wire 230. This energizes the relay 1CR closing its normally open contacts 1CR1 and 1CR2. Closing of the contacts 1CR1 provides a holding circuit about the switch 217 thereby maintaining the relay 1CR energized when the rotation of the turret disengages the cam 218 from the switch 217. Closing of contacts 1CR1 and 1CR2 completes a circuit through the relay coil IL to the wire 230 thereby energizing this relay and causing it to close its normally open contacts IL1, IL2, IL3. Closing of these latter contacts completes a circuit to the index motor leads 256, 257 and 258 from the wires 259, 260, 261 connected, respectively, with the power supply lines 220, 221 and 222. Closing of the contacts IL1 and IL2 has also energized the solenoid 28 for the brake on the index motor 25. Therefore, the index motor 25 is energized and freed for rotation in a direction productive of rotation of the turret as indicated by the arrow R in Fig. 1.

As the turret begins to rotate the switch actuator 210 moves from engagement with the switch 205 thereby causing the latter to open its contact 205c and close is contacts 205a and 205b. Opening of the contact 205c extinguishes the light 172 thereby indicating that a workhead is no longer positioned at the loading station. Shortly after rotation of the turret begins, the cam 194 on the bar 195 engages and operates the switch 191 provided on the back of the operational unit which is then leaving the loading station. Since the selector switch 190 was previously placed in its automatic position, the circuit is then closed through relay 2CR and solenoids 88 and CS. This circuit extends from the wire 234 through the normally closed contacts 233a, closed switch 189, the normally closed contacts 262a of the switch 262, associated with the hob shift mechanism in the housing 151, to and through the now closed switch 191, the closed switch 190, the normally closed switch 196 and the relay 2CR to the wire 237. Parallel circuits through the solenoids 88 and CS are also closed, switch 187 of the unit having previously been closed by the operator.

The relay 2CR, solenoids 88 and CS are maintained energized after the turret rotation has moved the cam 194 from operating engagement with the switch 191, with consequent opening of the latter, since the circuit is maintained through the now closed contacts 2CR1 of relay 2CR. Energization of the solenoid 88 causes the latter to move the associated valve 86 to a position such that supply of fluid pressure to the cylinder 83 is discontinued and the latter is vented. This allows the clutch 71 of the unit to engage by virtue of the force exerted by the springs 76, so that the rotating shaft 63 is now connected through the clutch and rotates the shaft 70. This causes rotation of the gears 89 and 93 which in turn rotate the gears 97 and 100. Rotation of the gear 100 drives the mechanism within the housing 151 thereby causing rotation and slow axial shift of the hob or tool carried upon the spindle 32. Rotation of the gear 97 causes rotation of the shaft 98 and the latter drives the gear 103, shaft 104 and gear train 108, worm 109 and worm wheel 110, thus rotating the work spindle 40. Rotation of the work spindle, in turn, causes the gear 111 to drive the gear 115 through the gears 112 and 114. This rotates the feed screw 116 elevating the workhead at the feeding rate since the feed nut 119 is now held stationary due to the engagement of the pin 145 between the teeth of the gear 122 connected with the feed nut of the unit. Since the hob or other tool is now in rotation and the work is rotated and moved vertically at the feeding rate, a hobbing or other machining operation is performed upon the workpiece of the operational unit. Coolant or cutting fluid is supplied to the hob and work during the hobbing operation since the energization of the solenoid CS has operated the valve 157 in the conduit 155 thereby allowing the flow of coolant from the reservoir 154.

The hobbing or other machining operation continues independently of rotation or non-rotation of the turret until the workhead has moved upwardly a distance corresponding to completion of the machining operation. This causes the button or abutment 199 on the upper portion of the workhead to engage the switch arm 197 moving the switch 196 to open position thereby deenergizing relay 2CR and solenoids 88 and CS. Deenergization of relay 2CR breaks the holding circuit through the contacts 2CR1 and the deenergization of the solenoid CS terminates the supply of coolant to the hob and workpiece. Deenergization of relay 88 causes the valve 86 to return to its position in which fluid pressure is supplied therethrough to the cylinder 83 thereby disengaging the clutch 71 terminating rotation of the tool spindle 32, work spindle 40, and the feeding movement of the workhead through termination of the rotation of the feed screw 116.

While the operational unit which has just been described as having been placed in operation is being carried by the turret from the loading station and is effecting the hobbing or other machining operation, a new operational unit is being moved into the loading station by rotation of the turret. As this new operational unit comes to the proper position, the rod or switch actuator 210 thereof engages the switch 204 opening the latter. This breaks the circuit to the relay 1CR which it will be remembered was held energized through the holding contacts 1CR1. The resulting deenergization of the relay 1CR causes it to open its contacts 1CR1 and 1CR2. This results in deenergization of the relay IL with resulting opening of the contacts IL1, IL2 and IL3. Opening of the latter contacts deenergizes the index motor 25 and the brake solenoid 28, thus terminating rotation of the worm 27 and the worm wheel 28. Due to the massiveness of the turret and the operational units associated therewith, the turret will coast only the very short distance so that the switch actuator moves from the bar 206 of switch 204 and comes to rest in engagement with bar 207 of switch 205. This distance may be predetermined and the switch operating bars 206, 207 correspondingly positioned since it will be remembered these bars are adjustably mounted.

When the turret comes to rest, as above mentioned, the switch rod or actuator 210 remains in engagement with the bar 207 for the switch 205 thereby closing the contact 205c thereof and opening the contacts 205a and 205b. Closing the contact 205c completes a circuit therethrough to and through the light 172 to the wire 230. The light 172 is therefore illuminated indicating that an operational unit is again properly positioned at the loading station. In the normal operation of the machine the hobbing operation performed by each unit will have been completed before that operational unit returns to the loading station. If, however, the machining or hobbing operation has not been completed the operator will readily observe this by the fact that the workpiece and the tool are still in operation and hence will not operate the rapid traverse start motor push button 169. Instead he will simply allow the machine to stand without rotation of the turret until the hobbing operation of the unit positioned at the loading station is completed and the switch 196 thereof thus operated to open the circuit disengaging the clutch 71. As noted above, however, it is generally not necessary to wait since the hobbing operation will be completed by the time the operational unit has returned to the loading station and the operator can then actuate the push button 169 as soon as the light 172 is illuminated indicating that the unit is in proper position.

Actuation of the push button switch 169 again completes the circuits, previously described, extending through the wires 244, 245, relay TA and solenoid 146, in parallel to the wire 230. This energizes the valve 147 operating the rapid traverse mechanism to engage the gear 132 thereof with the gear 122. Likewise, the rapid traverse motor 124 is again energized as has been previously described. The workhead of the newly positioned operational unit is, therefore, rapid traversed back to its initial position during which movement the switch 211 is reset, the movement being terminated when the workhead has reached its lowermost position and opened the switch 212. A new workpiece may then be placed in this unit and the operation thereof resumed, by again depressing the start button 169 whereupon the workhead moves in the upward direction at the rapid traverse rate until switch 211 is opened, the subsequent operations then continuing as previously described.

As mentioned heretofore and as is fully described in the aforementioned applications S. N. 757,256, filed January 26, 1947, and S. N. 56,726, filed October 27, 1948, the hob or tool spindle 32 is axially shifted at a very slow rate while it is being rotated, this continuous shifting being for the purpose of evenly distributing the wear upon the hob or other tool thereby increasing the life of the hob. When the hob spindle 32 has thus shifted its maximum extent and the hob must be replaced or reground, mechanism of the type disclosed in the said applications operates the switch 262 within the housing 151 thereby closing the contact 262b and opening the contact 262a of that switch. Closing of the contact 262b lights the lamp 186 provided on the unit switch assembly 185 for that operational unit thereby indicating that the hob or other tool of the unit must be replaced. Opening of the contacts 262a does not terminate the hobbing or other machining operation then in progress by the unit since a holding circuit is provided about the contact 262a by the contacts 2CR1 of the relay 2CR. However, when the machining operation has been completed and the switch 196 has therefore been operated, as previously described, to its open position a new hobbing operation cannot again be initiated for that operational unit even though the switch 191 be closed by rotation of the unit past the stationary cam 194. This follows from the fact that the contact 262a is now open so that the circuit for energizing the relay 2CR, solenoid 88 and solenoid CS cannot be completed. The operational unit may, however, be restored to operating condition by returning the spindle 32 to its initial position, after having replaced the hob or other tool. This will result in opening of the contact 262a and closing of the contact 262b of the microswitch 262.

In the event that any of the operational units overtravel, that is, if the workhead of any unit should move beyond the prescribed limits, the corresponding switch 203 associated with that workhead will be actuated closing its contact 203b and opening its contact 203a. Opening of the contact 203a prevents initiation of movement of that workhead at the feeding rate and will also disengage the clutch 71 if the latter should then be engaged and moving the workhead. Likewise, the supply of coolant will be terminated since the solenoid CS for the coolant valve will be deenergized. Closing of the contact 203b completes a circuit from the wire 228 through the wire 231, the coil of the relay SR, the collector ring 174, brush 179, wire 235 and the now closed contact 203b to the wire 263, and thence to wire 237, brush 181, and collector ring 176 to the wire 230. This energizes the relay SR causing it to open its contacts SR1, thereby breaking the circuit between the wires 233 and 234 so that the entire control circuit for the machine is deenergized terminating operation of all motors of the apparatus. Hence if the workhead of any one of the units overtravels the entire apparatus is stopped. The stop switches 164, 166, 168, 170 and 189 are provided to permit manual stopping of the associated mechanisms by breaking the circuits thereto.

*Manual operation*

The apparatus of this invention is also adapted for manual operation as well as automatic operation. Such manual operation is, of course, advantageous during initial set up and when making repairs or adjustments to the machine. In order to effect such manual operation the switch 171 at the main control panel or box 161 is moved to its "manual" position and the toggle switches 190 at each of the separate operational unit control boxes 185 is moved to the "manual" position. The apparatus is placed in operation, as before, by closing the switch 223, and by applying air pressure to the conduit 149, thus closing the switch 159. The operator then pushes the start button 163 for the cut motor 52 and start button 165 for the coolant pump motor 162 thus placing these motors in operation as will now be readily apparent.

Under manual operation the machine has normally not been previously set up and therefore the turret may not be located so that an operational unit is positioned exactly at the loading station. Assuming that the turret is not thus properly positioned, this positioning may be effected by "inching" or "jogging" the index motor 25 to rotate in one or the other directions as may be necessary to bring the turret to proper position. If the turret stands at a position such that rotation in the direction designated R would result in proper positioning, rotation of the turret may be effected by pressing the start switch 167 for the index motor 25 which will thus energize the relay ICR closing its contact ICR1 and ICR2 thereby energizing relay IL. Energization of the relay IL closes its contacts IL1, IL2 and IL3 thus energizing the index motor 25 for rotation to the left as viewed in Fig. 1 which is its normal direction of travel, the solenoid 28 also being energized so that the brake is released. The turret will then rotate and come to rest through operation of switches 204 and 205 as previously described under automatic operation.

In the event the turret has already operated too far in the direction R, rotation may be terminated and rotation in the opposite direction effected by actuating the jog button 255. Since the turret will have been too far beyond its proper position, the switch 205 will not be held engaged and consequently the contacts 205a and 205b thereof will be closed. Therefore operating the jog button 255 will now close a circuit through the normally closed contacts RU5, RD5, switch 168, wire 264, to and through the contact 205b and the lower contact 255b of jog switch 255, the circuit being completed through the relay IR to the wire 230. Relay IR is therefore energized and simultaneously therewith the relay ICR is deenergized since the circuit therethrough has been opened at the contact 255a of the jog switch. This deenergization of the relay ICR has also deenergized relay IL since the contacts ICR1 and ICR2 are now open. Therefore, the motor 25 is no longer energized through the contacts IL1, IL2 and IL3 but is now energized through the contact IR1, IR2 and IR3 so that the power lines 259, 260 and 261 are now respectively connected with the motor leads 257, 256 and 258. Therefore the brake 28 is now released and the motor 25 is energized for rotation in its reverse direction. This will continue as long as the jog switch 255 is held depressed and will terminate as soon as that switch is released as will be apparent from Fig. 12. The instant when the turret is properly positioned will be indicated by lighting of the indicating lamp 172 as the result of actuation of switch 205 by the switch operator 210.

If the turret should coast beyond its proper position the light 172 will be extinguished and the turret may be returned to its proper position by then operating the jog switch 254. Actuation of this switch closes a circuit through its lower contact 254b from the wire 264 through the normally closed contact 205a, now closed contact 254b to and through the relay IL, the circuit being completed to the wire 230. Hence the relay IL is now operated only so long as the switch 254 is held engaged since its upper contact 254a has opened the circuit to the holding relay ICR. As heretofore mentioned, energization of the IL relay closes the circuit from motor 25 through the contacts IL1, IL2 and IL3 causing rotation of the turret in the direction R as indicated by the arrow in Fig. 1. Hence by repeated operation of the jog switches 254 and 255, the turret may be properly positioned with one of the operational units thereof at the loading station, thereby engaging the switch 205 so that the contacts 205a, 205b thereof are open preventing further jogging operations while the switch 205c is closed illuminating the lamp 172 and indicating that operations may now be performed by the unit thus positioned at the loading station.

The push button switch 169 of the operational unit at the loading station is now actuated. This closes a circuit from wire 234 through the now closed contact 205c, switch 169, wire 244, wire 245, to and through the relay TA and the solenoid 146 in parallel thence to the wire 230 thereby energizing solenoid 146 and the relay TA. Energization of the solenoid 146 moves the rapid traversing mechanism to engage the gear 132 with the gear 122 of the operational unit and release the pin 145 from between the teeth of the gear 122 while energization of relay TA closes its contacts TA1 and TA2 a predetermined time thereafter as previously described.

Due to the nature of the switches 211 and 212, if the workhead be not at its lowermost position, the switch 212 will be closed. Consequently upon actuation of switch 169, when the workhead is at any position other than its lowermost position, a circuit is completed through the said switch 169, wire 246, wire 247, switch 212, the now closed contact TA2 and the relay RD, the circuit being completed through the latter to the wire 230. Energization of relay RD closes its contacts RD1, RD2, RD3, RD4 and RD6 and opens its contacts RD5 and RD7. Consequently, the rapid traverse motor 124 will be energized in a direction to return the workhead to its initial lowermost position in the manner previously described, a holding circuit for the relay RD being provided by contacts RD1 while the holding circuit for the relay TA and solenoid 146 is provided by the contacts RD6. When the workhead has reached its lowermost position, contact 212 is opened thus deenergizing relay RD, thereby terminating rotation of the rapid traverse motor 124 and deenergizing the solenoid 146 with resulting exhausting of fluid pressure from the cylinder 138 of rapid traverse mechanism so that the gear 132 is now disengaged from the gear 122 by action of the spring 133.

The workpiece may now be inserted in the operational unit positioned at the loading station of the apparatus and the push button 169 again actuated. Since the workhead is now at its lowermost position, the switch 212 will be open and the switch 211 will be in closed position. Hence a circuit is now completed through the switch 169, wires 244 and 245 energizing the relay TA and the solenoid 146 with the result that the contacts TA1 and TA2 are closed a predetermined time after actuation of the valve 147 supplying fluid pressure to the cylinder 138, as before described. Hence, the rapid traverse drive is again connected with the gear 122 of the operational unit and a circuit is now completed through the still depressed switch 169, the switch 211, the contact TA1 to and through the relay RU, the circuit being completed from the latter to the wire 230. Therefore, the RU relay is now energized, closing its contacts RU1, RU2, RU3, RU4 and RU6 and opening its contacts RU5. Contacts RU1 provide a holding circuit for the RU relay while the contacts RU6 provide a holding circuit for the TA relay and solenoid 146, thereby insuring that the rapid traversing mechanism remains in engagement with the gear 122. The closing of the contacts RU2, RU3, RU4 energizes the motor 124 for rotation in a direction effecting rapid traverse movement of the workhead in the upward direction which continues until the pin or actuator 215 engages switch 211 to move its contact to open position thereby breaking the circuit through the RU relay deenergizing the latter and hence the rapid traverse motor as well as effecting disengagement of the rapid traverse mechanism from the gear 122 as previously described.

The workhead with the workpiece therein has now been rapid traversed to a position such that the workpiece is adjacent the hob or tool on the spindle 32 and the feed nut is now held from rotation by virtue of the pin 145 being between adjacent teeth of the gear 122. The operator now momentarily depresses the start button 188 at the unit control box 185 for the unit which is positioned at the loading station. This completes a circuit from the wire 236 through the contact 203a, switch 189, contact 202a, switch 188, switch 196 to and through the relay 2CR, the circuit being completed at the wire 230. Likewise, the solenoid 88, controlling the valve 86 for the clutch 71 of the unit, and the CS solenoid, controlling the valve 157 for the coolant of the unit, are energized in parallel with the relay 2CR, the switch 187 for the coolant having been previously closed by the operator at the unit station 185. Energization of relay 2CR provides a holding circuit about the switch 188 by closing of contact 2CR1 so that the relay 2CR, solenoid 88, and solenoid CS remain energized after the push button 188 is released.

The energization of relay 88 has moved the valve 86 thereof to thereby terminate supplying fluid pressure to the cylinder 83 with the result that the clutch 71 for the unit is engaged, consequently rotating the tool spindle 32, work spindle 40 and the feed screw 116 as has been previously described. Therefore the workhead is now moved at a feeding rate bringing the workpiece into engagement with the tool and the machining operation is therefore performed on the workpiece. This continues until the workhead has moved vertically to a position such that the button or abutment 199 engages and operates switch 196 thus opening the circuit for the relay 2CR, solenoid 88 and solenoid CS. Deenergization of relay 2CR breaks the holding circuit for this relay and the solenoids 88 and CS. The deenergization of solenoid 88 again effects disengagement of the clutch 71 and deenergization of solenoid CS terminates the supply of coolant to the workpiece so that the machining operation is terminated.

The machined workpiece may then be removed from the operational unit and the operator then depresses start switch 169 at the main control box 161. This again energizes the rapid traversing mechanism G, as has been previously described, engaging the latter with the gear 122 and rotating it in a direction moving the workhead downwardly at the relatively rapid rate. During its downward movement, the workhead effects resetting of the switch 211 and at the lowermost position of its downward movement the switch 212 is opened terminating the movement. A new workpiece may then be inserted and the apparatus again utilized for machining by employing the same operational unit which is still located at the loading station. Hence the machine may be operated as a single unit mechanism although normally this type of manual control is intended for use only in setup of the device.

When it is desired to utilize another operational unit of the mechanism, the turret may be indexed as previously described by depressing start button 167. Since the operational unit which has been performing the machining operation was accurately located at the loading station, it will be apparent that the switch 204 will be closed. Hence the relay 1CR will be energized, thereby closing its contacts 1CR1, 1CR2 with resulting energization of relay IL. The latter relay then closes its contacts IL1, IL2 and IL3 energizing the index motor 25 and the brake 28 so that the motor now moves the turret in the direction indicated by the arrow in Fig. 1. This movement continues until the now operational unit is substantially positioned at the loading station at which time the arm or actuator 210 engages switch 204 momentarily opening the latter and deenergizing relay 1CR. This opens contacts 1CR1, 1CR2, deenergizing the relay IL thereby deenergizing the index motor 25 and applying the brake 28. As mentioned heretofore, the turret, however, will coast a slight distance and this distance is just sufficient to bring the arm or actuator 210 into engagement with the switch 205 closing the latter as is indicated by illumination of the light 172. In the event the turret should have overrun, it may be returned to its proper position by suitable jogging operations employing the buttons 254 and 255 as previously described. The new operational unit may then be set up and employed in a machining operation as was previously described above and these operations of indexing and setting up of each unit are repeated until each unit has been properly adjusted. The machine may then be placed in automatic operation as previously described.

SUMMARY

It must be apparent that the new and improved machine of this invention is of the turret type but nevertheless employs only a single rapid traverse motor for effecting a power driven rapid traverse movement of the individual workheads mounted upon the turret. This is effected by mechanism which provides for accurate positioning of each operational unit for cooperation with the rapid traverse mechanism. The machine may be readily provided with controls, as described, for operation in either an automatic or manual manner. For the sake of simplicity of description and disclosure the operations performed by the machine have been confined to conventional hobbing without "clean up" of the work at the end of the hobbing operation, or other features of operation often employed. It will be apparent, however, that by the use of suitable additional controls such, for example, as those illustrated in my copending application 757,256, the machine may be adapted for performing operations in addition to those here specifically set forth.

While the several switches mounted upon the stationary portion of the apparatus for operation by each workhead as the latter is positioned at the loading station have been indicated as mounted upon the apron or skirt for cooperation with abutments or actuators on the lower part of the workhead, it will be apparent that the switches and actuators may be otherwise positioned. For example, the switches might be provided upon a stationary ring surrounding the upper portion of the apparatus for cooperation with actuators carried upon the upper parts of the workhead. Moreover, it will be apparent that provision will be ordinarily made for adjusting the positions of the several cams or switch operators such as 210, 215, 216 and 218 on the workhead as well as for the adjustment of the switches 211, 212, 217, 204, 205 as shown.

Moreover, although the invention has been described as embodied in a machine for performing hobbing operations, it will be apparent that the invention is not limited thereto but may be embodied in machine tools for performing other operations by the substitution of suitable tools and actuating mechanisms for the hob. Other variations and changes, in addition to those specifically mentioned above, may be likewise made by those skilled in the art and therefore, while the preferred embodiment has been described in considerable detail, it is to be understood that the invention is not confined to the particular constructions illustrated and described but only as required by the spirit and scope of the appended claims.

Having thus described the invention, I claim:

1. A machine tool of the character described comprising a base, a turret rotatably supported on said base, a plurality of machining units supported by said turret at circumferentially spaced points thereabout with each of said units including a slidable member movable relative to said turret and cooperating relatively rotatable members operatively connected with said turret and said slidable member for producing said relative movement, means for rotating said turret, means automatically terminating rotation of the turret as each unit is sequentially positioned at a single loading station, and rotation producing means mounted on said base and sequentially operatively engaged with one of said relatively rotatable members of each unit when the latter is positioned at said loading station to effect movement of said slidable member of that unit.

2. A machine tool as defined in claim 1 further comprising means for restarting rotation of said turret and means preventing said restarting while the said rotatable member of a unit is being rotated by said rotation producing means.

3. A machine tool as defined in claim 1 and further comprising means actuated by movement of said slidable member to a predetermined position relative to said turret to terminate operation of said rotation producing means.

4. A machine tool of the character described comprising a base; a turret rotatably supported on said base; a plurality of machining units supported by said turret at circumferentially spaced points thereabout, each of said units including a rotatable tool spindle, a rotatable work spindle, means for rotating said spindles in timed relationship with respect to each other, means supporting one of said spindles for movement of the axis thereof relative to the other spindle in a plane parallel with the plane of the axis of said other spindle, and cooperating relatively rotatable members operatively connected with said turret and the said supporting means for producing said relative movement; means for rotating said turret; means automatically terminating rotation of the turret as each unit is sequentially positioned at a single loading station; and rotation producing means mounted on said base and sequentially operatively engaged with one of said relatively rotatable members of each unit when the latter is positioned at said loading station to effect said relative movement.

5. A machine tool of the character described comprising a base; a turret rotatably supported on said base; a plurality of machining units supported by said turret at circumferentially spaced points thereabout, each of said units including a rotatable tool spindle, a rotatable work spindle, means for rotating said spindles in timed relationship with respect to each other, means supporting one of said spindles for movement of the axis thereof relative to the other spindle in a plane parallel with the plane of the axis of the said other spindle, and cooperating relatively rotatable members operatively connected with said turret and the said supporting means for producing said relative movement; means for rotating said turret; means automatically terminating the rotation of said turret as each unit is sequentially positioned at a single loading station; rotation producing means mounted on said base and adapted to be sequentially operatively engaged with one of said relatively rotatable members of each unit when the latter is positioned at said loading station to effect rotation of said member; and means for effecting engagement of said rotation producing means with the said one rotatable member of a unit when the latter is positioned at said loading station.

6. A machine tool as defined in claim 5 and wherein the said means for effecting engagement of the rotation producing means with said one rotatable member includes means engaged and actuated by a portion of each unit when the latter is positioned at said loading station to condition the said engagement effecting means for operation, whereby the latter is effective only when a unit is positioned at said loading station.

7. A machine tool as defined in claim 5 and further comprising means for restarting rotation of said turret; and means preventing said restarting while said one rotatable member of a unit is being rotated by said rotation producing means.

8. A machine tool as defined in claim 5 and further comprising means actuated by movement of said spindle supporting means to a predetermined position to terminate rotation of said one rotatable member by the said rotation producing means.

9. A machine tool of the character described comprising a base; a turret rotatably supported by said base; a plurality of machining units supported by said turret at circumferentially spaced points thereabout, each of said units including a rotatable tool spindle, a rotatable work spindle, means for rotating said spindles in timed relationship to each other, means supporting one of said spindles for movement transversely of the other spindle and substantially parallel with the axis of the turret, and cooperating relatively rotatable members operatively connected with said turret and the said supporting means for producing said transverse movement; means for rotating said turret; means automatically terminating the rotation of said turret as each unit is sequentially positioned at a single loading station; rotation producing means mounted on said base including a driving member normally disposed out of engagement with respect to said one rotatable member of each unit; means connected with said driving member to move the latter into driving engagement with said one rotatable member of each unit when the latter is positioned at said loading station; and means including a manually actuated member for effecting operation of said driving member moving means.

10. A machine tool as defined in claim 9 and further comprising means actuated by movement of said spindle supporting means to a predetermined position to terminate rotation of said one rotatable member by said driving member.

11. A machine tool of the character described comprising a base; a turret rotatably supported by said base; a plurality of machining units supported by said turret at circumferentially spaced points thereabout, each of said units including a rotatable tool spindle, a rotatable work spindle, means for rotating said spindles in timed relation to each other, means supporting one of said spindles for movement transversely of the other spindle and substantially parallel with the axis of the turret, cooperating relatively rotatable threaded members operatively connected with said turret and the said supporting means for effecting said transverse movement, and means operatively connectible with one of said members to effect rotation thereof thereby causing said transverse movement at a relatively slow speed; means for rotating said turret; means automatically terminating the rotation of said turret as each unit is sequentially positioned at a single loading station; rotation producing means mounted on said base and adapted to be sequentially operatively connected to the other of said relatively rotatable members of each unit when the latter is positioned at said loading station to effect said transverse movement at a relatively rapid rate of speed; and means including a manually actuated member for initiating operation of said rotation producing means when any of said units is positioned at said loading station.

12. A machine tool as defined in claim 11 wherein each of said units further comprises means cooperating with said other rotatable member of the unit to hold the said other rotatable member from rotation when said one rotatable member is being rotated; and means automatically releasing said holding means when said rotation producing means is engaged with said other rotatable member.

13. A machine tool as defined in claim 11 and further comprising means actuated by transverse movement of said spindle supporting means of a unit positioned at said loading station to a first predetermined position to terminate operation of said rapid motion producing means; and means actuated by said transverse movement of the spindle supporting means of each unit to a second predetermined position to terminate rotation of said one rotatable member.

14. A machine tool as defined in claim 11 and further comprising means actuated by the spindle supporting means of a unit positioned at said load station when said supporting means is moved to a first predetermined position in said transverse movement to terminate operation of said rotation producing means; means for restarting rotation of said turret; means responsive to rotation of said turret to sequentially initiate operation of said means for rotating said one member of each unit; and means actuated by the said transverse movement of the spindle supporting means of each unit to a second predetermined position to terminate rotation of said one rotatable member of that unit.

15. A machine tool of the character described comprising a base; a turret rotatably supported by said base; a plurality of machining units supported by said turret at circumferentially spaced points thereabout, each of said units including a rotatable tool spindle, a rotatable work spindle, means for rotating said spindles in timed relation to each other, means supporting one of said spindles for movement transversely of the other spindle and substantially parallel with the axis of the turret, cooperating relatively rotatable threaded members operatively connected with said turret and the said supporting means for effecting said transverse movement, and means operatively connectible with one of said members to effect rotation thereof thereby causing said transverse movement at a relatively slow speed; means for rotating said turret; means automatically terminating the rotation of said turret as each unit is sequentially positioned at a single loading station; rotation producing means mounted on said base and including a driving member normally disposed out of engagement with respect to the other of said relatively rotatable members of each unit; means connected with said driving member to move the latter into driving engagement with said other rotatable member of each unit when the latter is positioned at said loading station to effect said transverse movement at a relatively rapid rate of speed; electrically actuated means for controlling operation of said driving member moving means; a manually actuated switch for initiating operation of said electrically actuated means; and electrical switch means actuated by said turret when each unit is positioned at said loading station to render said manually actuated switch effective.

16. A machine tool as defined in claim 11 wherein said driving member moving means comprises a fluid pressure operated mechanism; and said electrically actuated means comprises an electrically actuated valve for controlling supply of fluid pressure to said mechanism.

17. A machine tool of the character described comprising a base; a turret rotatably supported by said base; a plurality of machining units supported by said turret at circumferentially spaced points thereabout, each of said units including a rotatable tool spindle, a rotatable work spindle, means supporting one of said spindles for movement transversely of the other spindle and substantially parallel with the axis of the turret, a cooperating nut and lead screw operatively connected with said turret and the said supporting means respectively for producing said transverse movement, and means for rotating said spindles and said lead screw; means for rotating said turret; means automatically terminating the rotation of said turret as each unit is sequentially positioned at a single loading station; an electric motor mounted on said base; a driving member connected to said motor and normally disposed out of engagement with respect to said nut of each unit; electrically controlled means connected with said driving member to move the latter into driving engagement with the nut of each unit when the latter is positioned at said loading station, means including a manually actuated switch for energizing said motor and said driving member moving means; means to deenergize said motor and said driving member moving means when the spindle supporting means of a unit positioned at said loading station has moved to a first predetermined position; means to initiate operation of the means for rotating the spindles and lead screw of each unit as the latter leaves said loading station; and means terminating rotation of said spindles and lead screw of each unit when said spindle supporting means thereof has moved to a second predetermined position of its transverse movement.

18. A machine tool of the character described comprising a base; a turret rotatably supported by said base; a plurality of machining units supported by said turret at circumferentially spaced points thereabout, each of said units including a rotatable tool spindle, a rotatable work spindle, means supporting one of said spindles for movement transversely of the other spindle and substantially parallel with the axis of the turret, a cooperating nut and lead screw operatively connected with said turret and the said supporting means respectively for producing said transverse movement, and means for rotating said spindles and said lead screw; means for rotating said turret; means automatically terminating the rotation of said turret as each unit is sequentially positioned at a single loading station; an electric motor mounted on said base; a driving member connected to said motor and normally disposed out of engagement with respect to said nut of each unit; electrically controlled means connected with said driving member to move the latter into driving engagement with the nut of each unit when the latter is positioned at said loading station; means including a manually actuated switch for energizing said motor and said driving member moving means; means actuated by transverse movement of said spindle supporting means of a unit positioned at said loading station to a first predetermined position to deenergize said motor and said driving member moving means and to start rotation of said turret; means actuated by rotation of said turret to initiate operation of the means for rotating the spindles and lead screw of each unit as the latter leaves said loading station; and means actuated by transverse movement of the spindle supporting means of each unit when the said supporting means has reached a second predetermined position to effect termination of the rotation of said spindles and lead screw of the unit, 19. A machine tool as defined in claim 18 and wherein said means for energizing said motor and driving member moving means includes an electric circuit with a switch means therein engaged and actuated by said turret when each unit is positioned at said loading station to prepare said circuit for control by said manually actuated switch, whereby the latter is effective to energize said motor and driving member moving means only when a unit is positioned at said loading station.

20. A machine tool as defined in claim 18 wherein said motor is reversible; the said means for energizing said motor and driving member moving means includes an electric circuit and switch means in said circuit conditioning the latter for energizing said motor to rotate in a reverse direction after said spindle supporting member of a unit at the loading station has started to move to said first position, so that when the unit has returned to said loading station actuation of said manual switch energizes said motor and driving member moving means to return said spindle supporting member to its initial position; and means actuating the said conditioning switch means when the spindle supporting member of the unit at the loading station returns to its initial position to terminate reverse energization of said motor.

21. A machine tool as defined in claim 18 wherein each unit further comprises means cooperating with the nut thereof to hold said nut from rotation when said screw is being rotated; and means automatically releasing said holding means when said driving member is engaged with the nut of a unit.

22. A machine tool of the character described comprising a base; a turret rotatably supported by said base; a plurality of machining units supported by said turret at circumferentially spaced points thereabout, each of said units including a rotatable tool spindle, a rotatable work spindle, means supporting one of said spindles for movement transversely of the other spindle and substantially parallel with the axis of the turret, a cooperating nut and lead screw operatively connected with said turret and the said supporting means respectively for producing said transverse movement, and means including a clutch for rotating said spindles in timed relation to each other and for rotating said lead screw; means for rotating said turret; means automatically terminating the rotation of said turret as each unit is sequentially positioned at a single loading station; an electric motor mounted on said base; a driving member connected to said motor and normally held out of engagement with respect to said nut of each unit; electrically controlled means connected with said driving member to move the latter into driving engagement with said nut of each unit when the latter is positioned at said loading station, means including a manually actuated switch for energizing said motor and said driving member moving means; means actuated by transverse movement of said spindle supporting means of a unit positioned at said loading station to a first predetermined position to deenergize said motor and said driving member moving means and to start rotation of said turret; means actuated by rotation of said turret to engage said clutch of a unit as the latter leaves said loading station; and means actuated by transverse movement of the spindle supporting means of each unit effecting disengagement of the clutch of the unit when the spindle supporting means thereof has moved to a second predetermined position.

23. A machine tool of the character described comprising a base; a turret rotatably supported by said base; a plurality of machining units supported by said turret at circumferentially spaced points thereabout, each of said units including a rotatable tool spindle, a rotatable work spindle, means supporting one of said spindles for movement transversely of the other spindle and substantially parallel with the axis of the turret, a cooperating nut and lead screw operatively connected with said turret and the said supporting means respectively for producing said transverse movement, and means including a clutch for rotating said spindles in timed relation to each other and for rotating said lead screw; means for rotating said turret; means automatically terminating the rotation of said turret as each unit is sequentially positioned at a single loading station; a reversible electric motor mounted on said base; a driving member connected to said motor and normally disposed out of engagement with respect to said nut of each unit; means on each unit holding the nut thereof from rotation when said driving member is disengaged therefrom; electrically controlled means connected with said driving member to move the latter into driving engagement with said nut of each unit when the latter is positioned at said loading station; means including a manually actuated switch for energizing said motor for rotation in one direction and for energizing said driving member moving means; means actuated by engagement of said driving member with the nut of a unit to release said holding means; means actuated by transverse movement of said spindle supporting means of a unit positioned at said loading station to a first predetermined position to deenergize said motor and said driving member moving means and to start rotation of said turret; means actuated by rotation of said turret to engage said clutch of a unit as the latter leaves said loading station; means actuated by transverse movement of the spindle supporting means of each unit effecting disengagement of the clutch of the unit when the spindle supporting means thereof has moved to a second predetermined position; means including an electric switch conditioning said motor for rotation in a reverse direction after the spindle supporting member of a unit at said loading station has begun to move towards said predetermined positions so that actuation of said manual switch when the next unit is at said loading station causes said motor to rotate in reverse direction returning the spindle supporting member of said next unit to its initial position; and means on each of said spindle supporting members adapted to actuate the said conditioning switch when the unit is at the loading station and the spindle supporting member thereof has returned to its initial position thereby conditioning said motor for operation in said one direction.

OTIS E. STAPLES.

No references cited.